US006537050B1

United States Patent
Kasai et al.

(10) Patent No.: US 6,537,050 B1
(45) Date of Patent: Mar. 25, 2003

(54) UNDERWATER CUTTING GRANULATING DEVICE

(75) Inventors: Shigehiro Kasai, Takasago (JP); Katsunori Takahashi, Takasago (JP); Tatsuya Tanaka, Takasago (JP); Yoshinori Kuroda, Takasago (JP); Masahiko Kashiwa, Takasago (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/694,490

(22) Filed: Oct. 24, 2000

Related U.S. Application Data

(62) Division of application No. 09/179,894, filed on Oct. 28, 1998, now Pat. No. 6,174,475, which is a continuation of application No. PCT/JP98/00856, filed on Mar. 4, 1998.

(51) Int. Cl.[7] ............................................... B29C 47/08
(52) U.S. Cl. .................. 425/67; 425/311; 425/313; 83/607; 83/675
(58) Field of Search ................. 425/67, 311, 313; 83/675, 607, 906; 30/357

(56) References Cited

U.S. PATENT DOCUMENTS

| 3,029,466 A | * | 4/1962 | Guill | 425/313 |
|---|---|---|---|---|
| 3,196,487 A | * | 7/1965 | Snelling | 425/168 |
| 3,230,582 A | * | 1/1966 | Hoffman et al. | 425/67 |
| 3,676,029 A | * | 7/1972 | Hopkin | 425/67 |
| 3,808,962 A | * | 5/1974 | Liepa | 99/323.4 |
| 4,123,207 A | | 10/1978 | Dudley | 425/67 |
| 4,179,255 A | | 12/1979 | Hale | 425/67 |
| 4,529,370 A | * | 7/1985 | Holmes et al. | 425/142 |
| 4,569,810 A | | 2/1986 | Oriot et al. | 264/142 |
| 5,052,911 A | | 10/1991 | Mikeska | 425/67 |

FOREIGN PATENT DOCUMENTS

| FR | 2 659 250 | 9/1991 |
|---|---|---|
| WO | WO 96/33853 | 10/1996 |

OTHER PUBLICATIONS

Patent Abstracts of Japan, vol. 1997, No. 07, Jul. 31, 1997, JP 09 057745, Mar. 4, 1997.

* cited by examiner

*Primary Examiner*—Jan H. Silbaugh
*Assistant Examiner*—Joseph S Del Sole
(74) *Attorney, Agent, or Firm*—Oblon, Spivak, McClelland, Maier & Neustadt, P.C.

(57) ABSTRACT

In a knife used in an underwater cutting granulating device for cutting and granulating a fused resin extruded from a die to a water chamber by a cutter rotated in the state where the knife is opposed to the die, the knife of the cutter has a convex guide surface for guiding a water flow in the direction of drawing it toward the die, which is formed on the surface opposite to the surface facing the die and a curved concave guide surface on the side facing the die.

4 Claims, 21 Drawing Sheets

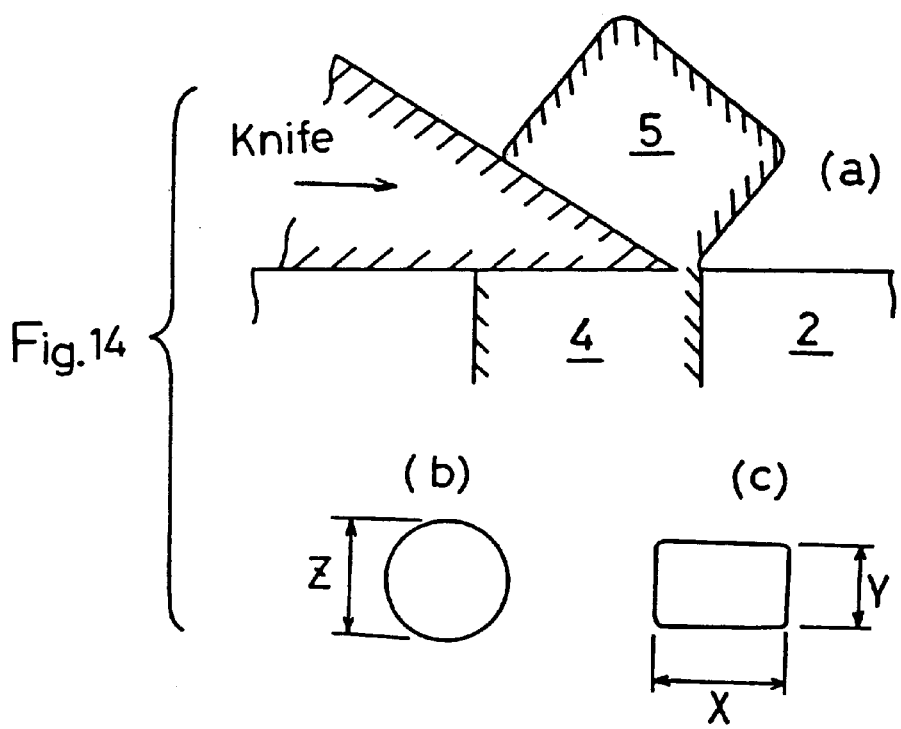
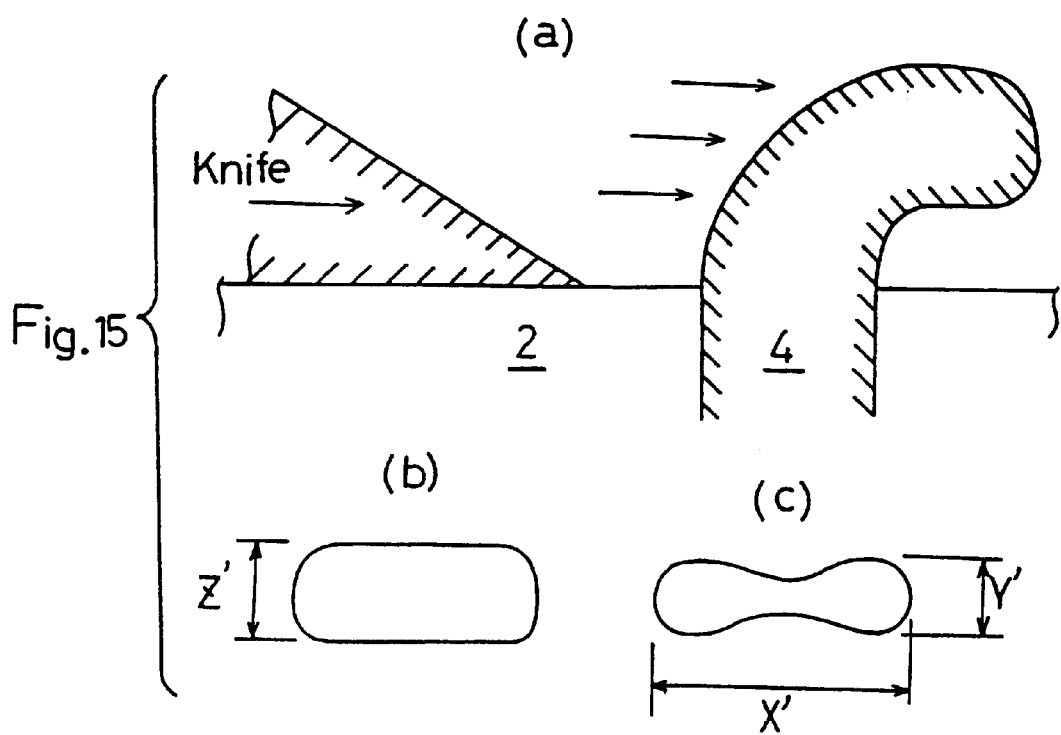

 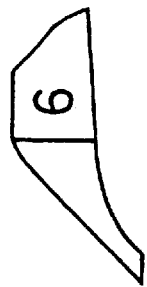 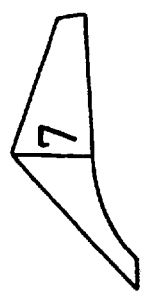 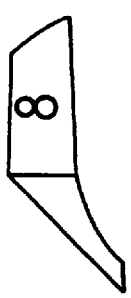
 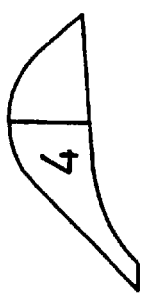
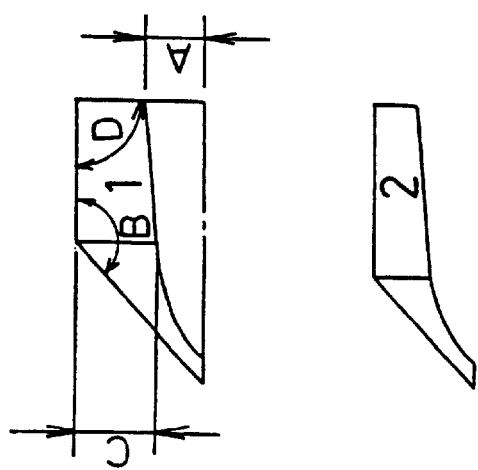
Fig. 18

Fig. 19
(1) Knife 1
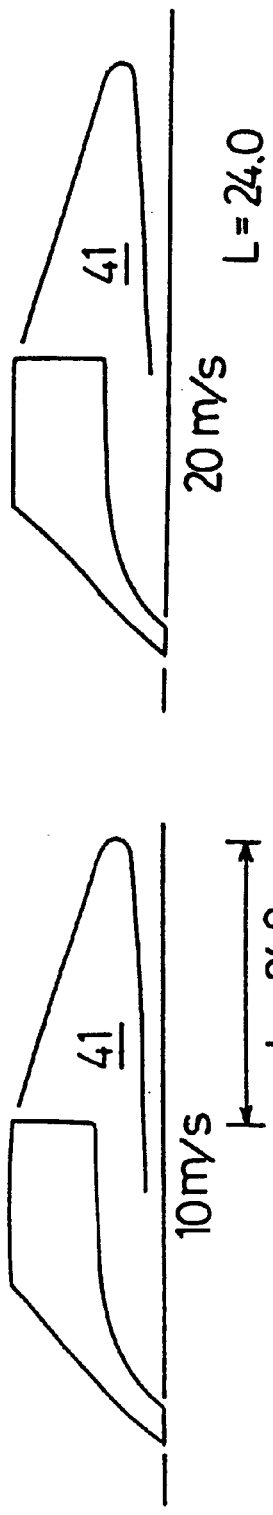
(2) Knife 2
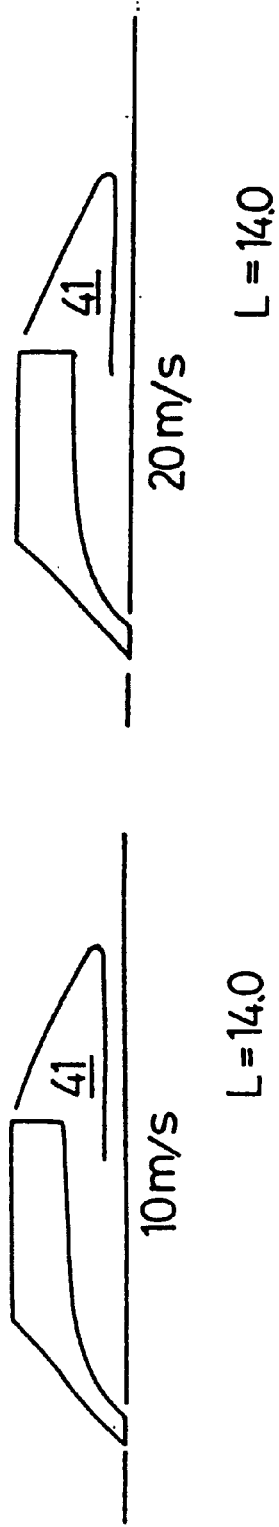

Fig. 20
(3) Knife 3
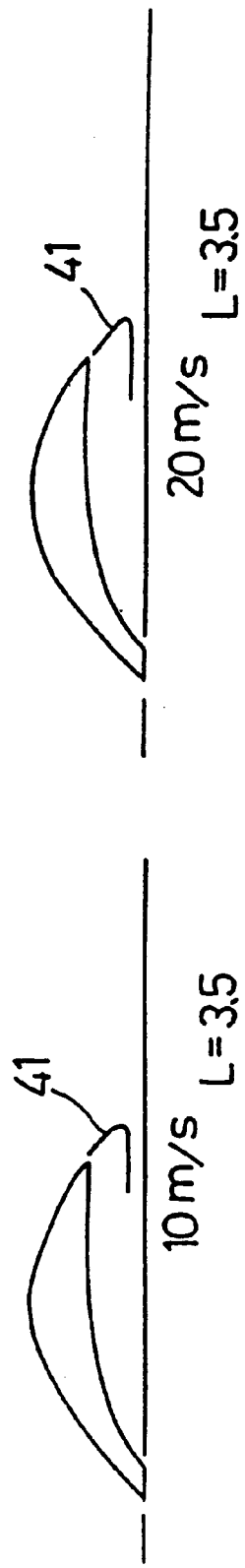
(4) Knife 4
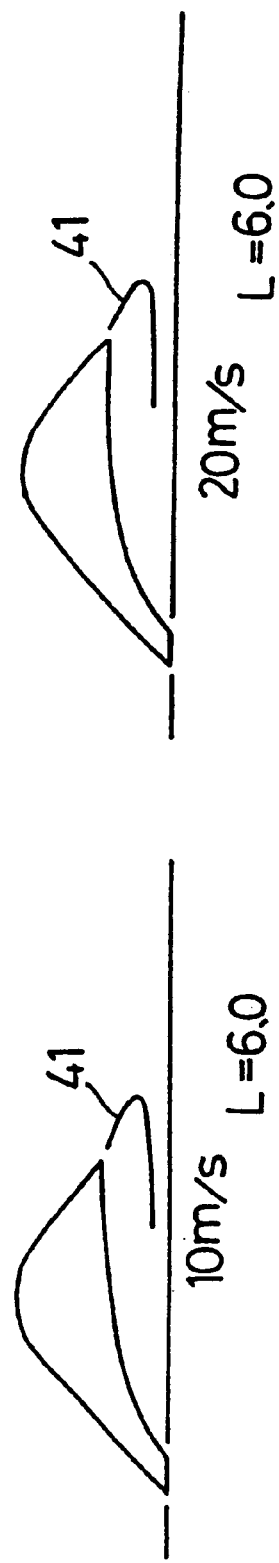

Fig. 21
(5) Knife 5
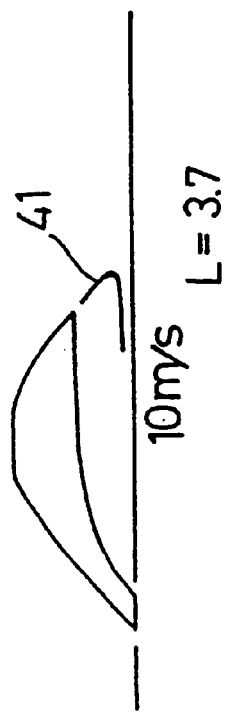
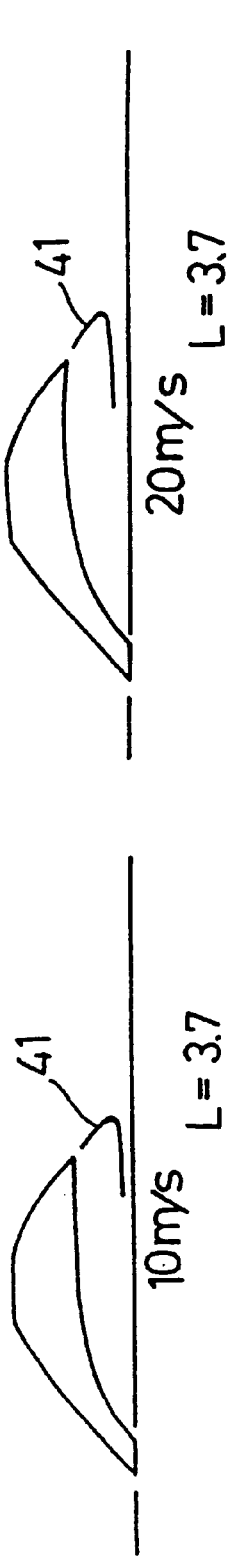
(6) Knife 6
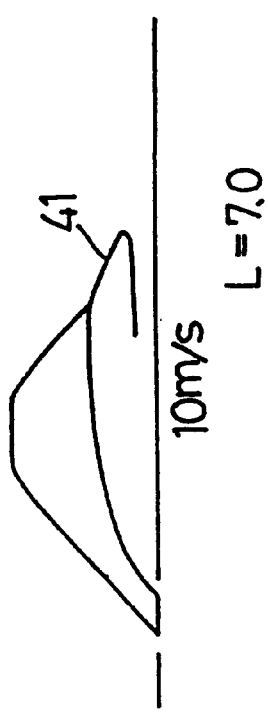
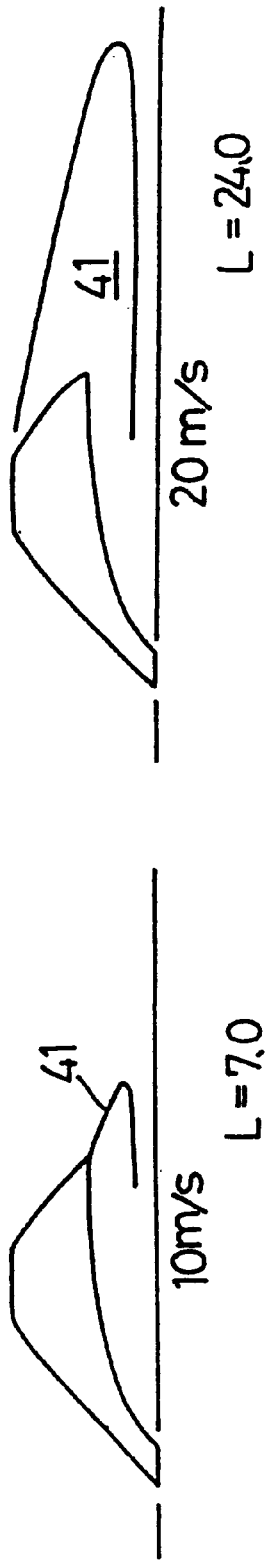

Fig. 22
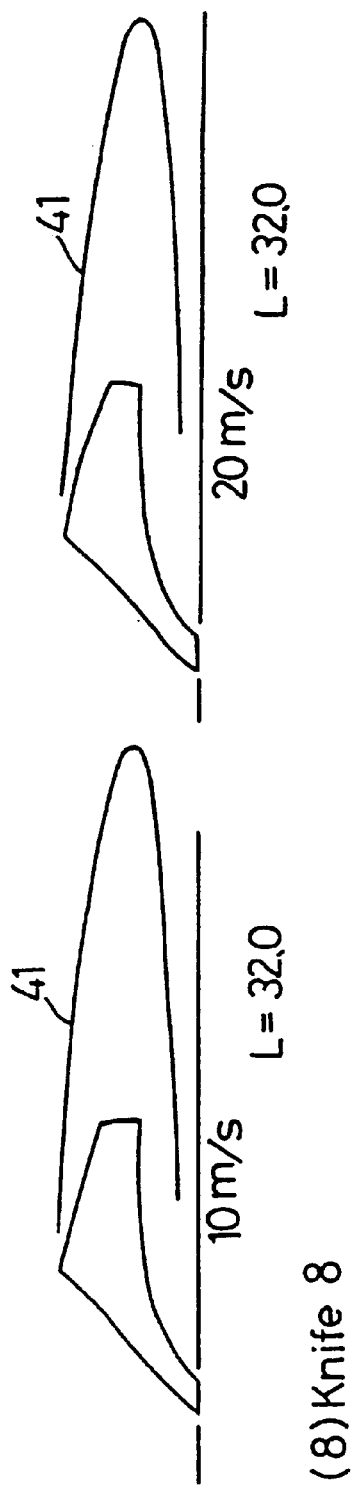
(7) Knife 7
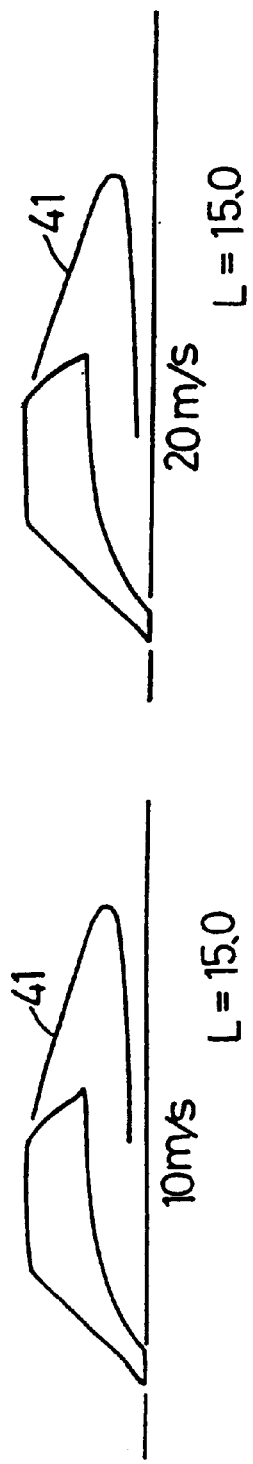
(8) Knife 8

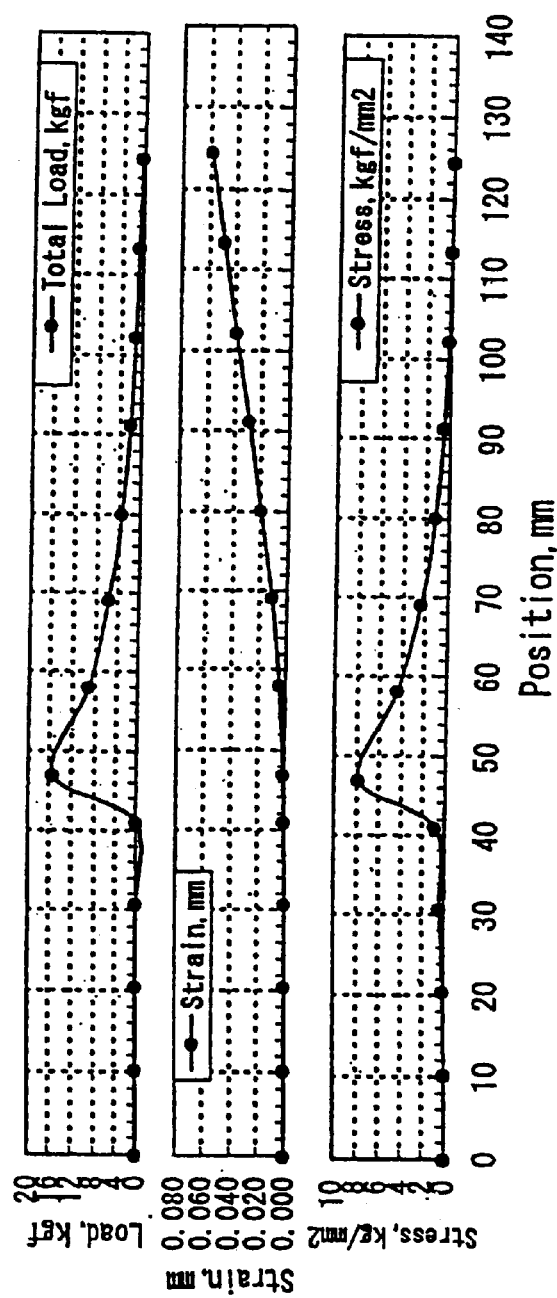
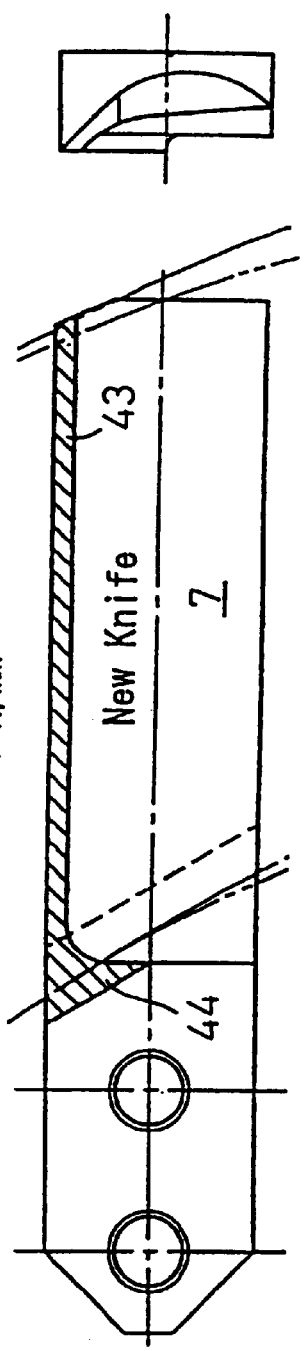
Fig. 24 The simulation results of the stress & the strain distribution under the operating condition Fig. 25
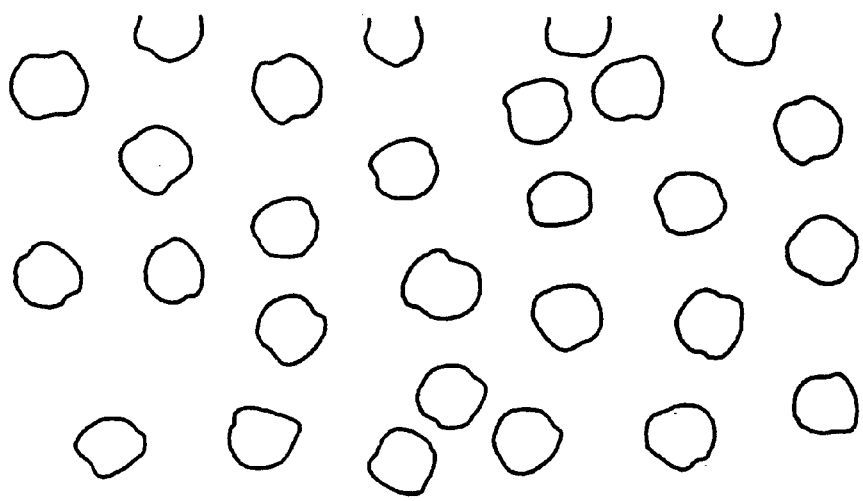
STAND./MFR=30
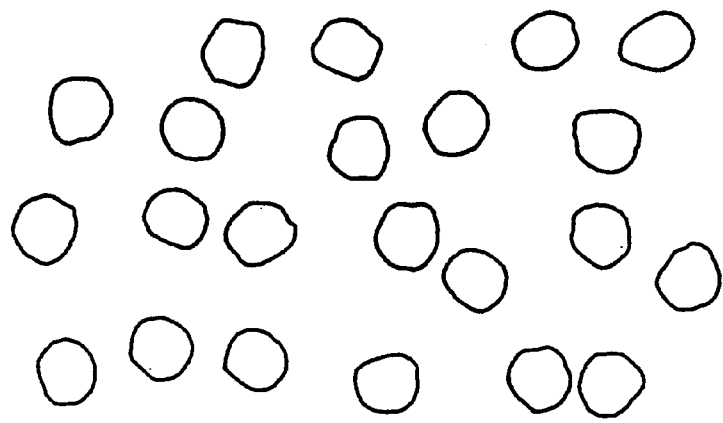
NEW /MFR=30

Fig. 26
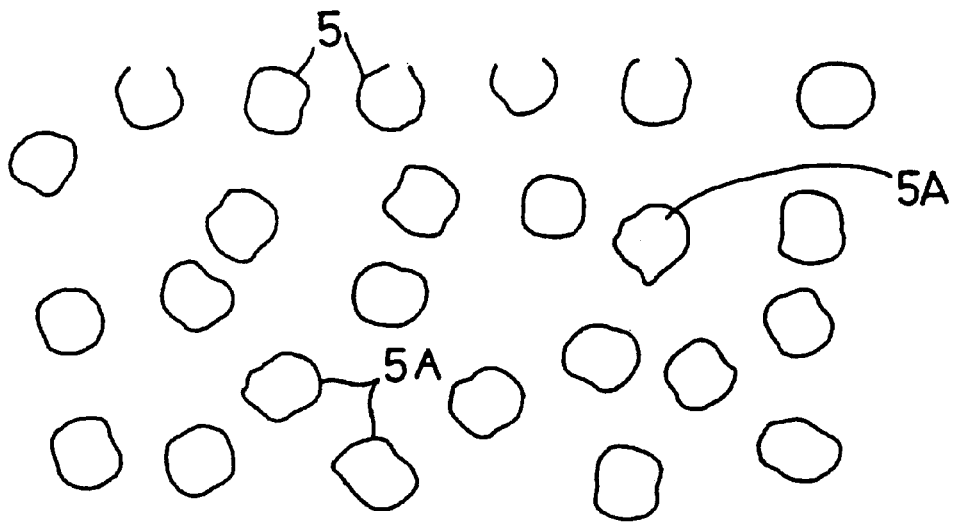
STAND./MFR=60
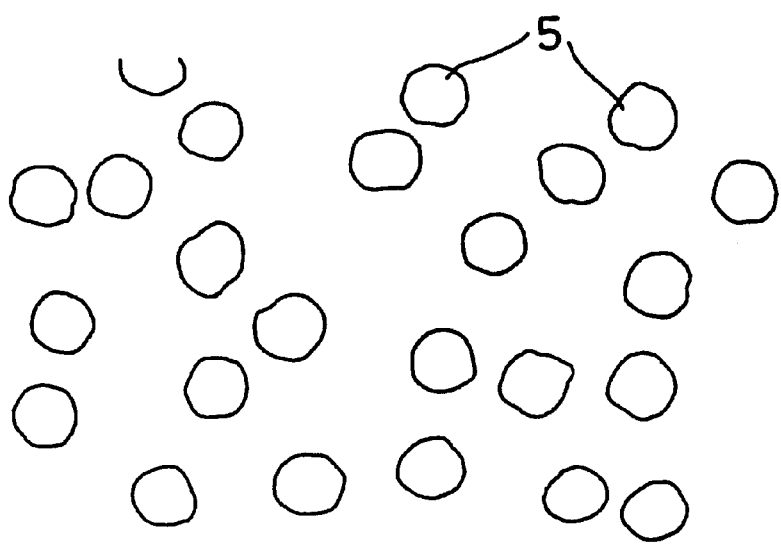
NEW /MFR=60

Fig. 27
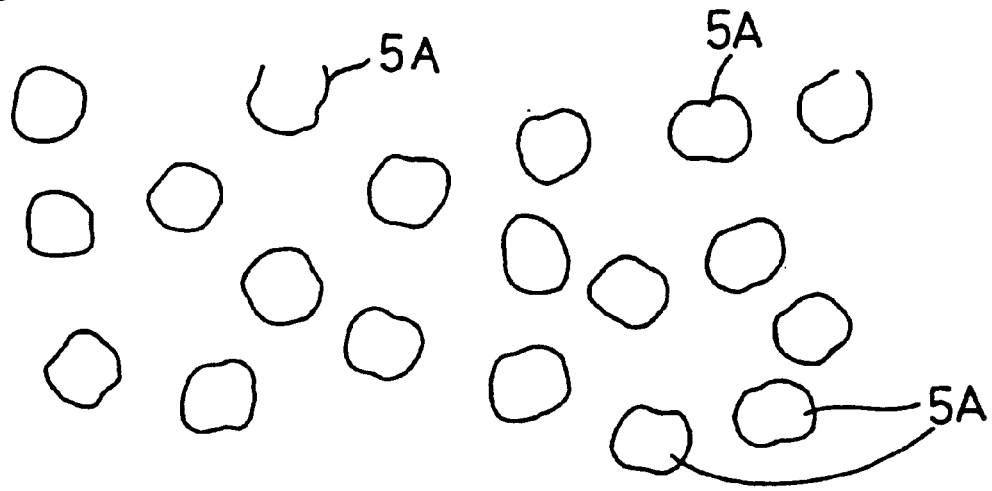
STAND./MFR=85
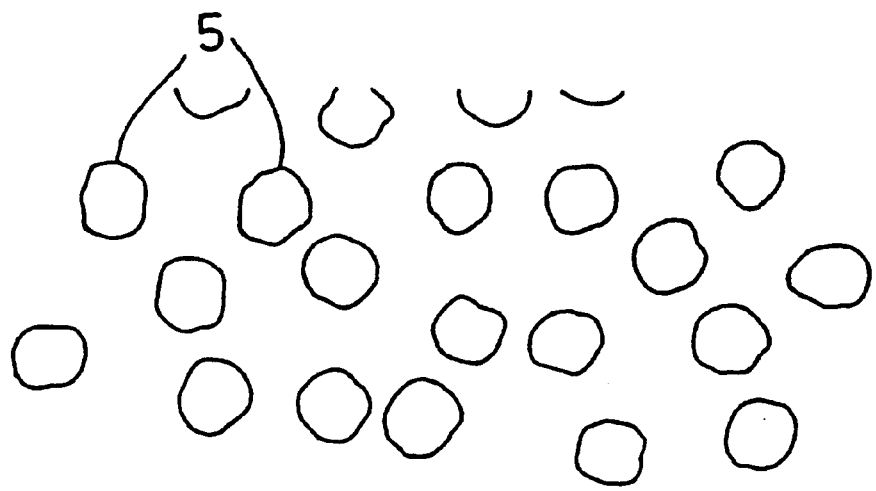
NEW /MFR=85

Fig. 28
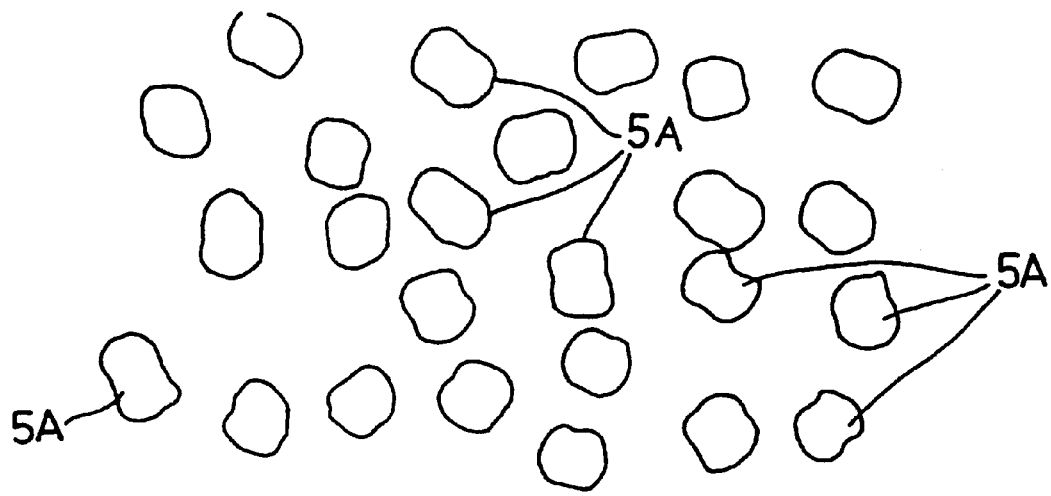
STAND./MFR=115
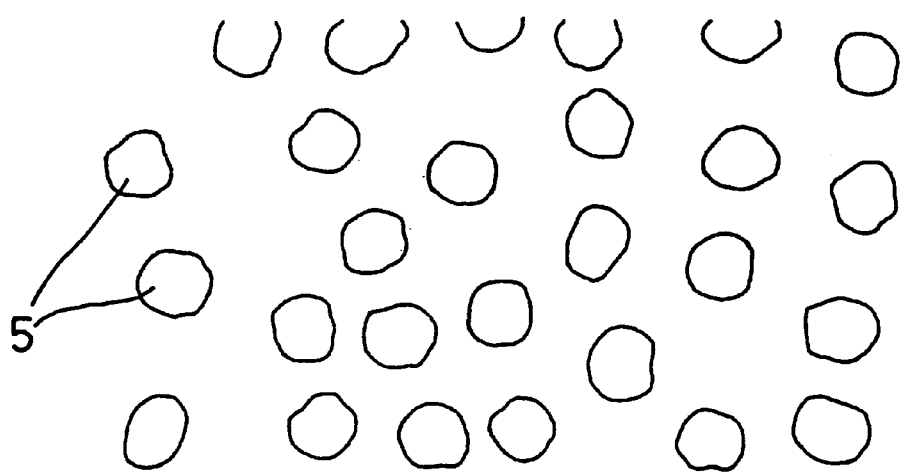
NEW /MFR=115

UNDERWATER CUTTING GRANULATING DEVICE

This application is a division of application Ser. No. 09/179,894, filed on Oct. 28, 1998, now U.S. Pat. No. 6,174,475, which is a continuation of PCT Application PCT/JP98/00856, filed on Mar. 4, 1998.

FIELD OF THE INVENTION

The present invention relates to an underwater cutting granulating device used for manufacturing resin-made pellets, a knife used in this device, and an underwater cutting granulating method preferably using this knife.

BACKGROUND ART

This type of underwater cutting granulating device is generally provided with a die plate having a large number of die holes, a water chamber formed so as to surround the cut surface of the die plate, a knife holder housed rotatably within this water chamber, a driving means for rotating the knife holder in a fixed direction, and a plurality of knives mounted on the knife holder.

A feed water supply system for circulating cooling water is connected to the water chamber. A resin feeder such as gear pump is connected to the die, so that a fused resin from a resin kneading machine is pressurized and supplied into the water chamber.

Accordingly, the fused resin extruded from the die into the water chamber, the skin of which is cooled at the same time the fused resin is pushed into the water chamber, is finely cut by the knives, cooled and hardened within the water chamber, and granulated into pellets.

Most knives conventionally used for such an underwater cutting granulating device have, for example, a substantially triangular section as shown by the virtual line in FIG. 1 or a substantially trapezoidal section as shown in FIG. 16, wherein the rotating directional rear side (rear surface) is cut off vertically to the cut surface of the die.

When the rotating directional rear side (rear surface) of the knife is vertical to the cut surface in this way, the high-speed rotation of the knife increases the proportion of causing a turbulence in the rear thereof, which develops into a cavitation. Thus, the rotating resistance of the knife is increased by the turbulence itself or the entrainment of bubbles by the cavitation, and most of the driving force of the knife is consumed for this resistance, which contributed to a reduction in driving efficiency.

The large rotating resistance of the knife is linked to the higher flow velocity of a rotating directional water flow (different from the circulating flow of water by the feed water supply system) running along the cut surface of the die according to the rotation of the knife.

Therefore, when such a high MFR (melt flow rate) material with low viscosity that MFR exceeds 10 was used as the fused resin, the high-speed water flow trailing the knife caused a defect such as curve, deformation, crushing, hairline or the like (particularly remarkable with MFR>30) in the pellet shape after cutting.

Such a pellet having a shape defect is not only deteriorated in commercial value by the visual failure, but also caught in a hopper part in extrusion or extrusion molding, which often leads to a reduction in yield or reduction in operability of the underwater cutting granulating device.

In consideration of the circumstances as described above, the present invention aims at preventing the occurrence of a shape defect even in a resin material with high MFR by reducing the rotating resistance of knife to water to suppress the turbulence and cavitation and minimizing the generation of a turbulent part trailing the knife as much as possible.

SUMMARY OF THE INVENTION

The present invention takes the following technical means in order to attain the above object.

Namely, in an underwater cutting granulating device related to the present invention, the knife of a cutter is formed so that the height dimension (h) laid along its rotating axial center is thinned, whereby the rotating resistance to water is reduced.

In this case, "to thin the height dimension (h)" can be realized specifically by setting the maximum distance A from the cutter surface of the knife to the inner surface (die-side surface) and the maximum thickness C of the knife to $C \leqq 1.2A$.

Since the dimension A of this kind of knife is set to 4~6 mm in order to avoid the interference with the fused resin regularly extruded from the die holes, the maximum thickness C can be set to 4.8~7.2 mm or less.

Since the rotating resistance to water can be minimized because of the small height dimension (h) according to the present invention, the velocity of the circling directional water flow generated along the die according to the rotation of the knife can be also lowered.

Therefore, even a high MFR material can be granulated while suppressing the shape defect of pellet as much as possible, and various conventional disadvantages resulted from this shape defect can be prevented.

The minimization of the turbulence caused on the rotating directional rear side of the knife can also lead to the suppression of the cavitation, and the consumption of the cutter driving force can be consequently suppressed to enhance the driving efficiency. Further, the cut surface of the die plate can be prevented from being damaged early by the collision of a large number of bubbles generated by the cavitation with the die plate.

On the other hand, as another method for reducing the rotating resistance to water of the knife, a mountain-shaped (convex) guide surface is formed on the surface opposite to the die. In this case, a curved valley-shaped (concave) guide surface is suitably formed also on the surface facing the die so as to be conformed to the mountain-shaped guide surface.

The mountain-shaped guide surface means a surface having a part inclined away from the die in the rotating directional front part and a part inclined nearer to the die in the rotating directional rear part. Thus, the water flow generated along the mountain-shaped guide surface is drawn to the die side in the rear of the knife.

The valley-shaped guide surface means a surface having a part inclined away from the die in the rotating directional front part and a part inclined nearer to the die in the rotating directional rear part. Thus, the water flow generated along the valley-side guide surface on the inside of the knife is similarly pressed onto the die side.

Since each of the water flows laid along the mountain-shaped guide surface and the valley-shaped guide surface are headed toward the die in any case, the separation of water in the rotating directional rear side of the knife is smoothed, and the turbulence and cavitation can be suppressed.

This structure thus has the advantage that the velocity of the circling directional water flow accompanying the rotation of the knife can be lowered to prevent the shape defect in the use of high MFR materials, not to mention that the driving efficiency of the cutter can be enhanced with suppression of the consumption of the cutter driving force.

Since the down force acting on the knife is lowered when the water flow on the rotating directional rear side of the knife is thus turned to the die side, the subsidiary effect that the pressing force of the knife onto the cut surface of the die can be reduced to suppress the wear of the both and extend the lives can be provided.

The above mountain-shaped guide surface or valley-shaped guide surface has no limitation for the forming position to the knife, but it is preferably formed closer to the rotating directional rear side in order to efficiently provide the effect of heading the water flow for the die side as described above.

The mountain-shaped guide surface or valley-shaped guide surface may be formed of a bent surface as a plurality of flat surfaces are joined, but it is suitably formed into a smoothly continued curved surface in the sense of reducing the rotating resistance to water of the knife. In the formation of such a curved surface, it is more preferable to make the sectional form laid along the rotating direction of the knife into a streamline shape. The combination of flat surface with curved surface can be adapted.

Further, when both of the structure of thinning the height dimension of the knife and the structure of providing the mountain-shaped guide surface and the valley-shaped guide surface on the knife are adapted, the resulting effect can be more ensured and made more satisfactory by the synergistic effect thereof The knife to be intended by the present invention, more specifically, has a cutter surface opposed to the cut surface of a die plate, a front surface raised from the rotating directional front edge of the cutter surface in the state inclined on the anti-cut surface side toward the rotating directional rear, a back surface extended from the rear edge of the front surface substantially backward in the rotating direction, a rear surface continued to the rear edge of the back surface, and an inner surface having an inclined part raised from the rotating directional rear edge of the cutter surface in the state inclined on the anti-cut surface side toward the rotating directional rear, and continued to the rear surface in the rotating directional rear edge thereof.

In the knife having the form described above according to the present invention, the rear surface is formed with an inclination on the cut surface side toward the rotating directional rear, and the transition angle B° from the front surface to the back surface and the transition angle D° from the back surface to the rear surface are set so as to be $150° \leq (B+D)/2 \leq 180°$. Further, in the knife according to the present invention, more preferably, the maximum distance A from the cutter surface to the inner surface and the maximum thickness C of the knife are set so as to be $C \leq 1.2A$.

As is apparent from the FEM analytical experiment described later, the same velocity water flow part running near the die plate together with the knife is extremely shortened in the rotating directional rear of the knife even when the knife is rotated at a general rotating speed of 10~20 m/s, and the shape failure of pellets accompanying the mowing down of the used resin by the water flow part can be prevented.

In the present invention described above, the crossing line part between the rear surface and the inner surface is formed into a knife edge, whereby the turbulence of the water flow in the rotating directional rear of the knife can be more surely prevented, and the enlargement of the same velocity water flow part can be more effectively suppressed.

Further, it is recommended to provide, in the cutter surface, a part wider than the other part having cutter function in the position corresponding to the rotating directional central side part of the die plate to which the fused resin is not extruded.

In this case, since the contact area of the cutter surface to the cut surface is increased by the formation of the wider part to reduce the force per unit area acting on the cutter surface, the wear of the cutter surface of the knife and the cut surface of the die plate can be delayed as much as possible.

As long as the relation between the angle B° and the angle D° and the relation between the maximum distance A and the maximum thickness C are set as described above, the back surface of the knife can be curved on the anti-cut surface side so that no ridge line clearly appear between the front surface and the rear surface, or flatly formed so as to cross the front surface and the rear surface through ridge lines.

On the other hand, it was verified by the experiment described later that the shape failure of pellet could be solved as much as possible even in case of a high MFR resin, if L and H determined as follows were set so as to keep the relation of $L \leq 4H$ in the operation by use of this kind of underwater cutting granulating device.

L: The rotating directional length of the same velocity water flow part formed on the rotating directional rear side of the knife and running near the die plate at substantially the same velocity as the knife.

H: The extrusion length of the fused resin extruded from the die plate during the period from the cutting by one knife to the cutting by the following knife.

If the rotating speed of the driving means of the cutter is set so that the relation of $L \leq 4H$ is regularly established, the shape failure of pellet can be solved for the present.

However, the establishment of the relation of $L \leq 4H$ in the state where the extruding speed of the fused resin and the rotating speed of the knife are remarkably low is not very suitable for the actual operation because the production of pellets significantly falls.

In a general operation of rotating at a high speed (10~20 m/s) by use of the above-mentioned knife of the present invention, granulation is desirably performed while holding the relation of $L \leq 4H$. According to the knife of the present invention, even when the driving means of the cutter is rotated at 10~20 m/s necessary for such a general operation, the shape failure of pellet can be solved by holding the relation of $L \leq 4H$, and occurrence of cavitation can be also effectively prevented.

BRIEF DESCRIPTION OF DRAWINGS

FIG. 14(a) is an enlarged sectional view showing an ideal cutting state, (b) is a plane view of a pellet obtained in this state, (c) is a side view of the pellet.

FIG. 15(a) is an enlarged sectional view showing an improper cutting state, (b) is a plane view of a pellet obtained in this state, and (c) is a side view of the pellet.

FIG. 18 is a view showing the sectional form of each of knives No. 1~8 subjected to a numerical experiment by FEM analysis.

FIG. 19 is a distribution chart of the same velocity water flow parts of the knives Nos. 1 and 2.

FIG. 20 is a distribution chart of the same velocity water flow parts of the knives Nos. 3 and 4.

FIG. 21 is a distribution chart of the same velocity water flow parts of the knives Nos. 5 and 6.

FIG. 22 is a distribution view of the same speed water flow parts of the knives of Nos. 7 and 8.

FIG. 24 is a view showing the form and dynamic characteristics of the knife according to the present invention.

FIG. 25 is an enlarged view of pellets with MFR=30.

FIG. 26 is an enlarged view of pellets with MFR=60.

FIG. 27 is an enlarged view of pellets with MRF=85.

FIG. 28 is an enlarged view of pellets with MRF=115.

BEST MODE FOR CARRYING OUT THE INVENTION

Preferred embodiments of the present invention will now be described on the basis of the accompanying drawings.

Figure 9:
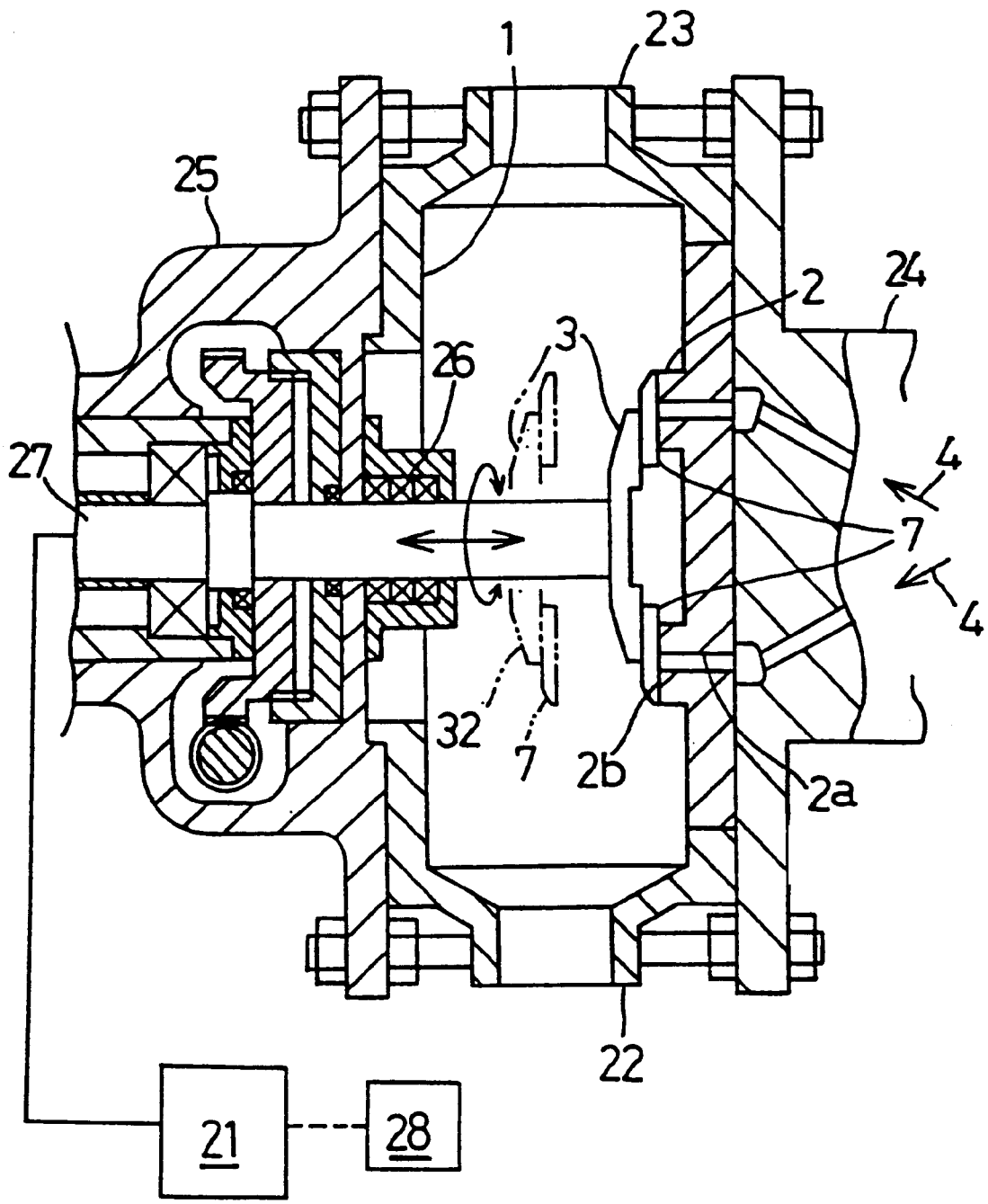
FIG. 9 is a side sectional view of an underwater cutting granulating device capable of using the knife according to the present invention.

FIG. 9 is a side sectional view of an underwater cutting granulating device 20 to which a knife 7 according to the present invention is applicable.

This granulating device 20 is provided with a die plate (die) 2 having a large number of die holes 2a, a water chamber 1 formed so as to surround the cut surface 2b of the die plate 2, a cutter 3 housed rotatably within the water chamber 1, and a driving means 21 for rotating the cutter 3.

The die plate 2 blocks the water chamber 1 so as to form one side wall (the right wall in FIG. 9) of the water chamber 1. A feed port 22 for connecting a feed water supply system not shown is formed in the lower part of the water chamber 1, and a drain port 23 for discharging the internal water together with pellets 5 to the outside is provided in the upper part of the water chamber 1.

The chamber 24 of an extruding machine consisting of a two-axis kneading machine or gear pump is connected to one end of the water chamber 1. Thus, a fused resin 4 pushed into the water chamber 1 through the die holes 2a of the die plate 2, the skin of which is cooled at the same time the fused resin 4 is extruded into the water chamber 1, is finely cut by the knife 7 described later, then cooled and hardened within the water chamber 1, and granulated into the pellets 5.

A bearing case 25 having the driving means 21 consisting of an electric motor or the like connected thereto is connected to the other end of the water chamber 1. A rotating shaft 27 is inserted to the bearing case 25 through a bearing 26 in such a manner as to be retractable and rotatable, and the top end of the rotating shaft 27 is protruded into the water chamber 1. To the driving means 21, a setting means 28 consisting of a microcomputer or processor computer for setting the rotating speed of the driving means 21 is connected.

The cutter 3 is fixed to the top end of the rotating shaft 27. The cutter 3 is formed of a disc-like knife holder 32 whose center part is fixed to the rotating shaft 27, and a plurality of knives 7 mounted radially on the knife holder 32.

Figure 1:
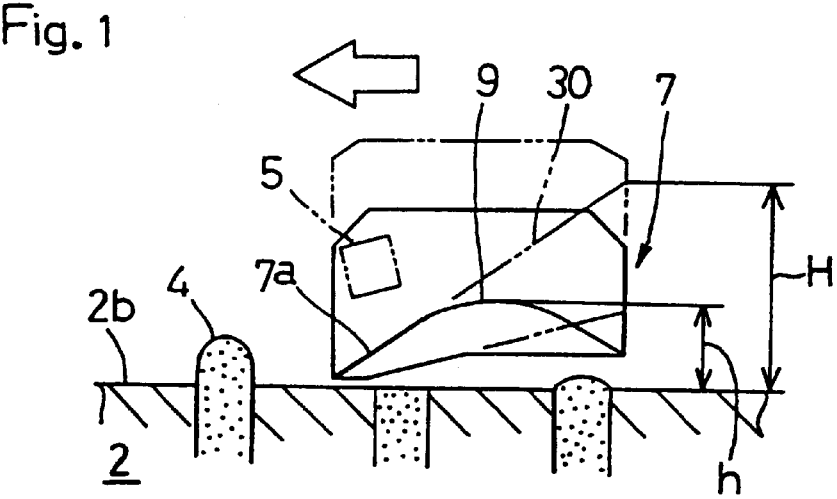
FIG. 1 is a side view seen from the rotating directional outside of a knife of a first embodiment of the present invention (the view seen from the line B—B of FIG. 3), which shows the state of cutting a fused resin extruded from a die.
Figure 2:
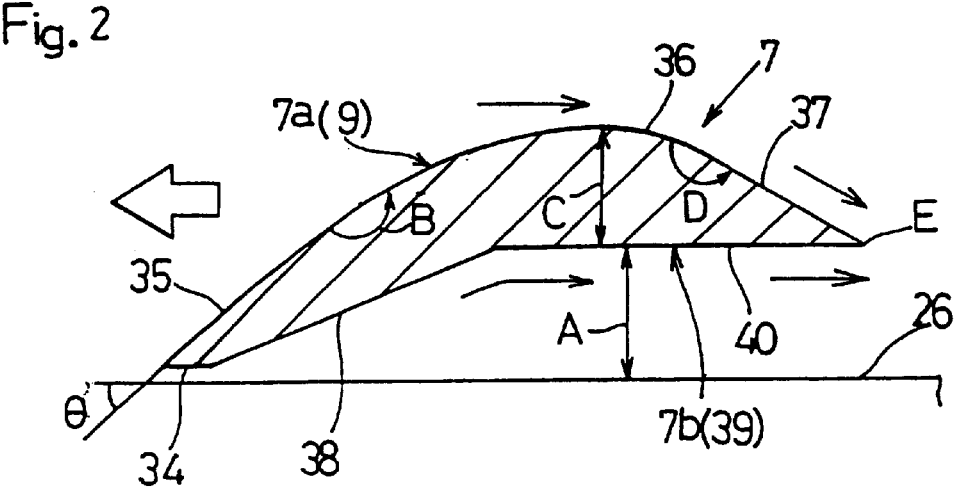
FIG. 2 is an enlarged sectional view of the knife of the first embodiment.
Figure 3:
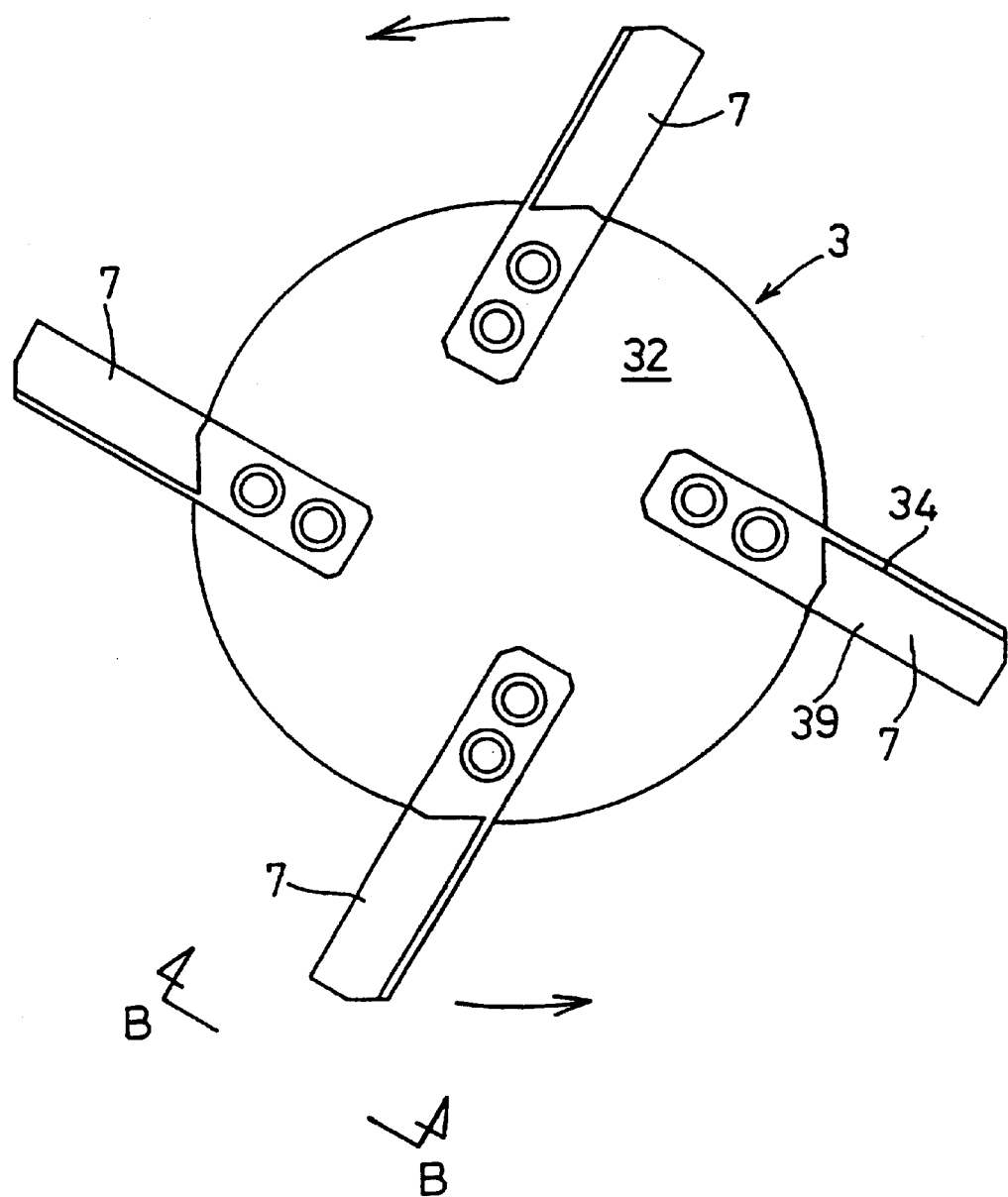
FIG. 3 is a view of a cutter having the knife of the first embodiment installed thereto, which is seen from the cut surface side.

FIGS. 1~3 show the first embodiment of the knife 7 to be used in the cutter 3 of the underwater cutting granulating device 20 according to the present invention.

While a triangular sectional type conventional knife 30 has a tall vertical surface formed on the rotating directional rear side as shown by the two-dot chain line in FIG. 1, the surface (outer surface) 7a opposed to the surface facing the die 2 of the knife 7 according to the present invention is formed so as to be curved near the rotating directional middle part and inclined down toward the die plate 2 side on the rotating directional rear side.

In the knife 7 of the first embodiment, the rotating directional rear half part of the die 2 side surface (inner surface) 7b is formed flatly substantially in parallel to the cut surface 2b of the die 2 as shown in FIG. 2.

Thus, the height dimension (h) in the rotating axial direction (the lateral direction in FIG. 9) in the knife 7 of the first embodiment is rather thinned, compared with the height dimension H of the triangular sectional type conventional knife 30. The thickness of the knife 7 itself is also rather small.

The rotating resistance to water of this knife 7 can be thus minimized, so that the velocity of the circling directional water flow generated along the front surface of the die 2 is not very high even if the knife 7 is rotated at high speed. The effect of suppressing the turbulence in the rotating directional rear side of the knife 7 can be also provided.

The curved surface provided on the outer surface 7a of the knife 7 forms a mountain-shaped guide surface 9 for drawing the water flow onto the die 2 side in the rear of the knife 7. This mountain-shaped guide surface 9 has, in the outer surface 7a opposite to the die 2, a part 35 inclined away from the die 2 on the rotating directional front side and a part 37 inclined nearer to the die 2 on the rotating directional rear side.

Thus, the water flow laid along the outer surface 7a of the knife 7 is drawn onto the die 2 side along the inclined surface in the rear side at the same time it climbs over the mountain-shaped guide surface 9, and the water flow can be consequently smoothly separated form the rotating directional rear side of the knife 7, whereby the occurrence of turbulence or cavitation can be suppressed Since the circling directional water flow generated along the front surface of the die 2 is never increased in velocity even when the knife 7 is rotated at high speed, and hardly causes turbulence, which thus hardly develops into cavitation, the consumption of the cutter driving force can be suppressed to enhance the driving efficiency. Further, various advantages such that the shape defect can be prevented even in the use of a high MFR material can be also provided.

The sectional form of the knife 7 of this embodiment is more specifically described below.

This knife 7 has a cutter surface 34 making contact with the cut surface 2b of the die plate 2, a front surface 35 raised from the rotating directional front edge of the cutter surface 34 in the state inclined on the anti-cut surface 2b side toward the rotating directional rear, a back surface 36 extended from the rear edge of the front surface 35 substantially backward in the rotating direction, a rear surface 37 continued to the rear edge of the back surface 36, and an inner surface 39 having an inclined part 38 raised from the rotating directional rear edge of the cutter surface 34 in the state inclined on the anti-cut surface 2b side toward the rotating directional rear, and continued to the rear surface 37 in the rotating directional rear edge.

The inner surface 39 has a flat part 40 on the rear side of the inclined part 38, and the rear surface 37 is formed so as to be inclined on the cut surface 2b side toward the rotating directional rear. The front surface 35 and the rear surface 37 are flatly formed, and the back surface 36 is formed into a curved surface swollen on the anti-cut surface 2b side so that no ridge line dearly appear between the front surface 35 and the rear surface 37. Further, the crossing line part between the rear surface 27 and the inner surface 39 is formed into a knife edge E.

In this embodiment, the mountain-shaped guide surface 9 is thus formed of the continued front surface 35, back surface 36 and rear surface 37.

The sectional form of the knife 7 of this embodiment is set so that each of expressions (1) and (2) can be established with respect to each of parameters A~D defined as follows on the basis of the knowledge from the experiment described later.

$$150° \leq (B+D)/2 \leq 180° \quad (1)$$

B: Transition angle from the front surface to the back surface
D: Transition angle from the back surface to the rear surface $$C \leq 1.2A \quad (2)$$

A: Maximum distance from the cutter surface to the inner surface
C: Maximum thickness of the knife The inclination θ of the front surface 35 to the cutter surface 34 is generally set to about 30°~60° so as to continuously perform a cutting with little edge chipping. The maximum distance A is generally set to about 4~6 mm so as to avoid the interference with the fused resin 4 to be continuously extruded.

As is apparent from the numerical experiment described later, the same velocity water flow part 41 running near the die plate 2 together with the knife 7 in the rotating directional rear of the knife 7 is extremely shortened even when the knife 7 is rotated at a rotating speed in actual operation such as 10~20 m/s, whereby the shape failure of the pellets 5 accompanying the mowing down of the fused resin 4 by this water flow part can be prevented.

In this embodiment, the cutting edge part of the knife 7 is formed with a fixed sectional form over the whole length. The sectional form of the cutting edge part may be indeed longitudinally changed within the range satisfying the relations of the expressions (1) and (2).

Figure 4:
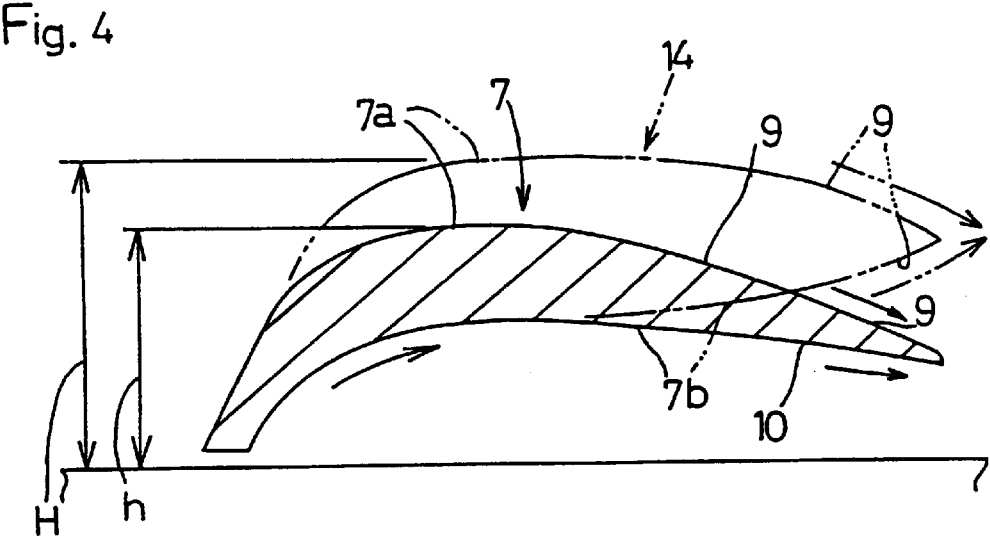
FIG. 4 is an enlarged sectional view of a knife of a second embodiment of the present invention.

FIG. 4 shows the knife 7 employed in a second embodiment of the present invention, wherein the knife 7 has not only the mountain-shaped guide surface 9 formed on the outer surface 7a, but also a valley-shaped guide surface 10 formed on the inner surface 7b.

The valley-shaped guide surface 10 is formed by bending the inner surface 7b inward nearer to the die 2 in the rotating directional rear of the knife 7, so that the tail direction is formed to be laid along the tail direction of the mountain-shaped guide surface 9.

Thus, the water flow laid along the inner surface 7b of the knife 7 receives the deflecting effect by physical contact as it approaches the rotating directional rear side of the knife 7, and it is consequently pressed onto the die 2 side in the rotating directional rear part of the knife 7. Therefore, the inside water flow of the knife 7 can be also smoothly separated backward in the rotating direction of the knife 7, so that the occurrence of turbulence or cavitation can be prevented.

By providing both of the mountain-shaped guide surface 9 and the valley-shaped guide surface 10, the respective water flows separated from the rotating directional rear side of the knife 7 receive the force of water when they are combined to provide the advantage that the above effect can be synergistically enhanced. Thus, in this second embodiment, the effect transcending at least that of the first embodiment can be provided.

Since the effect of directing the water flow on the rotating direction rear side of the knife 7 toward the die 2 is particularly strong in the second embodiment, although the same is true for the first embodiment, the down force on the die 2 side to the knife 7 is reduced. Therefore, the pressing action of the knife 7 onto the cut surface 2b of the die 2 is reduced, providing the subsidiary effect that the wear of both the members can be suppressed.

Further, since the mountain-shaped guide surface 9 and the valley-shaped guide surface 10 are formed of curved surfaces in this second embodiment, the knife 7 has a streamline-shaped sectional form in which the whole body is surrounded by a curve, which provides the advantage that the resistance laid along the rotating direction to water is extremely minimized. Particularly, the mountain-shaped part on the rotating directional front end part in the outer surface 7a is suitably formed of a smooth curved surface.

In FIG. 4, a knife 14 of a comparative example in which the height dimension in the rotating axial direction is set to the same as the height dimension H of the triangular sectional knife 30 of FIG. 1 is also shown.

Since this knife 14 of the comparative example has a mountain-shaped guide surface 9 on the outer surface 7a, the effect of directing the water flow laid along the outer surface 7a toward the die 2 side can be provided similarly to the first and second embodiments.

However, the knife 14 of the comparative example has a sectional form similar to wing section as the whole, and a recurved mountain-shaped guide surface 9 is also formed on the rear part of the inner surface 7b. Therefore, the water flow laid along the inner surface 7b of the knife 14 is directed away from the die 2 by the recurved mountain-shaped guide surface 9 on the inner surface 7b.

This means that the directivity might be canceled by the water flow guided to the mountain-shaped guide surface 9 on the inner surface 7b side although the water flow is directed to the die 2 side by the mountain-shaped guide surface 9 on the outer surface 7a side with effort. Thus, even if the occurrence of cavitation can be suppressed to some degree in the rotating directional rear side of the knife 14, this effect is considered to be inferior to the knife 7 of the present invention shown in FIG. 1.

The formation of the recurved mountain-shaped guide surface 9 on the inner surface 7b rear part of the knife is contrary to the gist of the present invention of guiding the water flow to the die 2 side by forming the guide surface 9 inclined nearer to the die 2 side in the outer surface 7a rear part of the knife.

Figure 11:
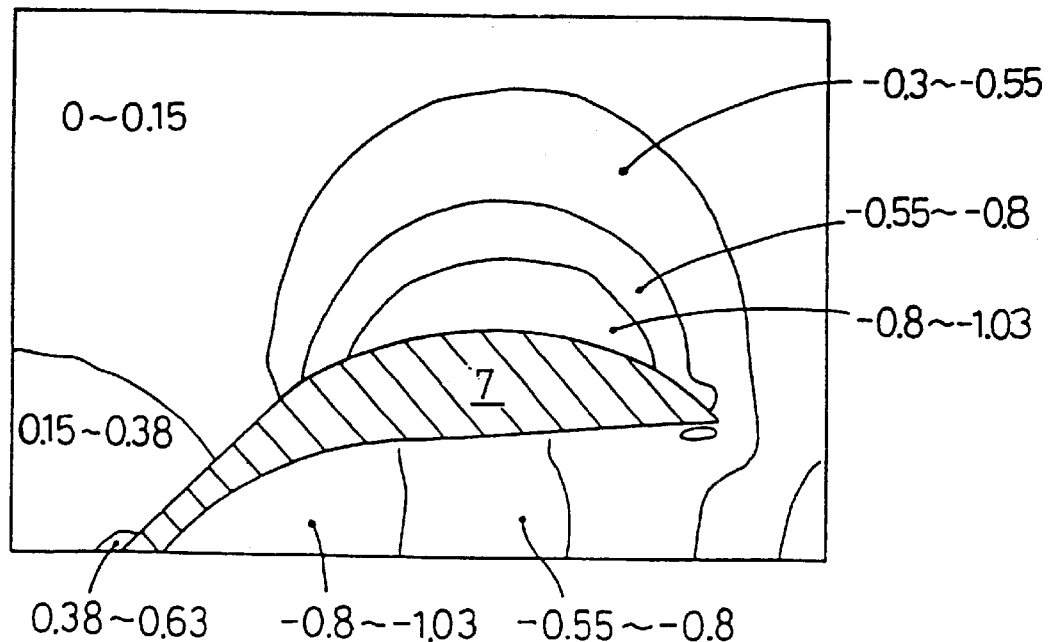
FIG. 11 is a pressure distribution chart of the knife according to the present invention by FEM analysis.

Of course, if the inner surface 7b rear part of the knife is formed flatly (the flat part 40 in FIG. 2), the plane of the inner surface 7b of the knife may be slightly inclined away from the die 2, for example, as shown in FIG. 11 or FIG. 18.

Figure 5:
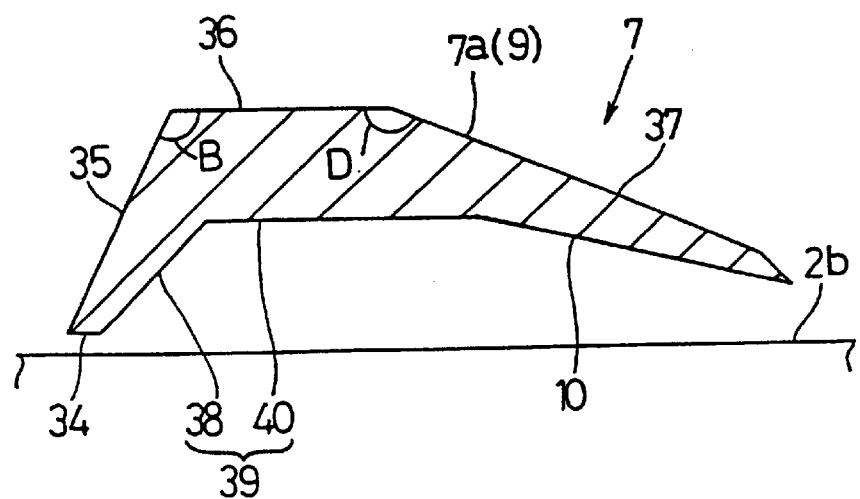
FIG. 5 is an enlarged sectional view of a knife of a third embodiment of the present invention.

FIG. 5 shows the knife 7 of a third embodiment of the present invention. This knife 7 has the mountain-shaped guide surface 9 and valley-shaped guide surface 10 formed of bent surfaces as a plurality of flat surfaces are joined. Namely, the back surface 36 of this knife 7 is formed flat so as to cross the front surface 35 and the rear surface 37 through ridge lines.

Figure 6:
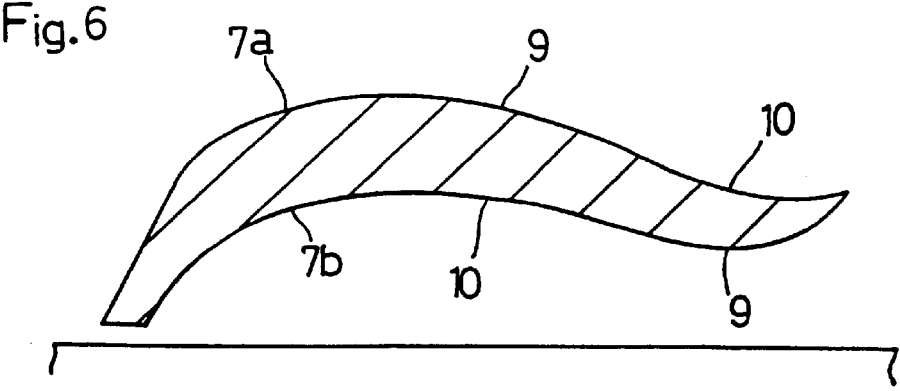
FIG. 6 is an enlarged sectional view of a knife of a fourth embodiment of the present invention.

It is also possible to supplementarily form the valley-shaped guide surface 10 closer to the rotating directional rear side over the mountain-shaped guide surface 9 on the outer surface 7a, or supplementarily form the mountain-shaped guide surface 9 closer to the rotating directional rear side over the valley-shaped guide surface 10 on the inner surface 7b, as the knife 7 of a fourth embodiment of the present invention shown in FIG. 6.

Since this is intended to regulate the water flow to the most effective low speed every performance (size or applicable rotating speed) or operating condition of the cutter 3, it should go without saying that the supplementarily provided valley-shaped guide surface 10 on the outer surface 7a or mountain-shaped guide surface 9 on the inner surface 7b never absorbs or obstructs the natural effect of the mountain-shaped guide surface 9 on the outer surface 7a or the valley-shaped guide surface 10 on the inner surface 7b.

Figure 7:
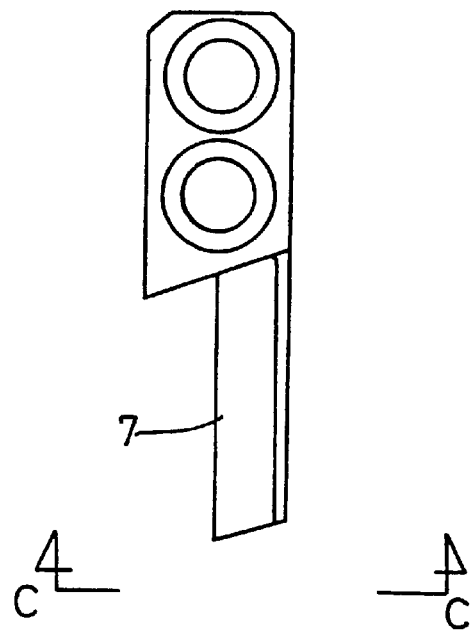
FIG. 7 is a view seen from the cut surface side of a knife of a fifth embodiment of the present invention.
Figure 8:
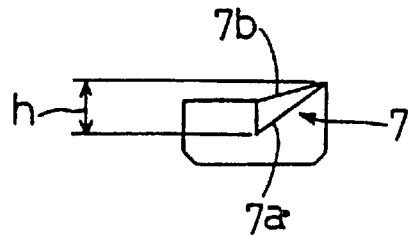
FIG. 8 is a view seen from the line C—C direction of FIG. 7.

As means to minimize the height dimension (h) of the knife 7, the rotating directional length can be cut narrowly as shown in FIG. 7 and FIG. 8. This structure has the advantage that the present invention can be executed only by subjecting the conventional knife 30 to a simple additional work.

EXAMPLE 1

In order to compare the use of a knife 7 according to the present invention shown by the actual line in FIG. 1 with the use of a triangular sectional type conventional knife 30 shown by the virtual line in FIG. 1, a granulation test was performed by use of high materials with MFR≈70 and MFR≈100.

In this example 1, the state of occurrence of cavitation in the water chamber 1 was visually determined by the same judge. At a result, generation of bubbles was recognized at about when the circumferential speed of the knife outermost part exceeded 10 m/s, and such countless bubbles as to make the water chamber 1 snow-white were generated at about when the circumferential speed reached 20 m/s.

In contrast to this, bubbles were hardly observed even at a point of time when the circumferential speed reached 20 m/s in the knife 7 according to the present invention.

On the other hand, whether the shape failure of the high MFR materials can be prevented or not was judged by estimating the flow velocity of the water flow generated near the front surface of the die 2 by CAE analysis and observing the actually obtained pellets. At a result, estimated values of Reynolds number and pellet drag shown in the following table 1 were obtained.

TABLE 1

| | Reynolds Number | Pellet Drag |
| --- | --- | --- |
| Knife of the present invention | $3.17 \times 10^4 \sim 6.33 \times 10^4$ | 0.67~9.17 |
| Conventional knife | $3.56 \times 10^4 \sim 9.50 \times 10^4$ | 1.50~0.21 |

As is apparent from the above table, the flow velocity of the knife 7 according to the present invention is about 0.67 times with respect to the Reynolds number, compared with the conventional triangular sectional knife 30. Thus, the pellet drag of the knife 7 according to the present invention is about 0.43 in average when regarded as the force loaded on pellets, and it was found from the result that the shape defect in pellets could be prevented as much as possible.

In the pellets obtained by actual granulation by use of the knife 7 of the present invention, the ratio of normal ones with little shape defect was extremely high in both cases of MFR=74 and MFR=105, while pellets having shape defects were contained in a considerable ratio in both cases of MFR=74 and MFR=95 when the conventional knife 30 was used.

EXAMPLE 2

In order to verify that the knife 7 of the present invention was superior to a so-called trapezoidal sectional knife 31 of conventional knives, a numerical experiment by FEM analysis was performed. This analysis comprises dividing the pressure and velocity of the water around the knife when the knife is rested in a water flow having a fixed velocity into many elements followed by calculation by FEM, and the results are shown in FIGS. 10–13.

Figure 10:
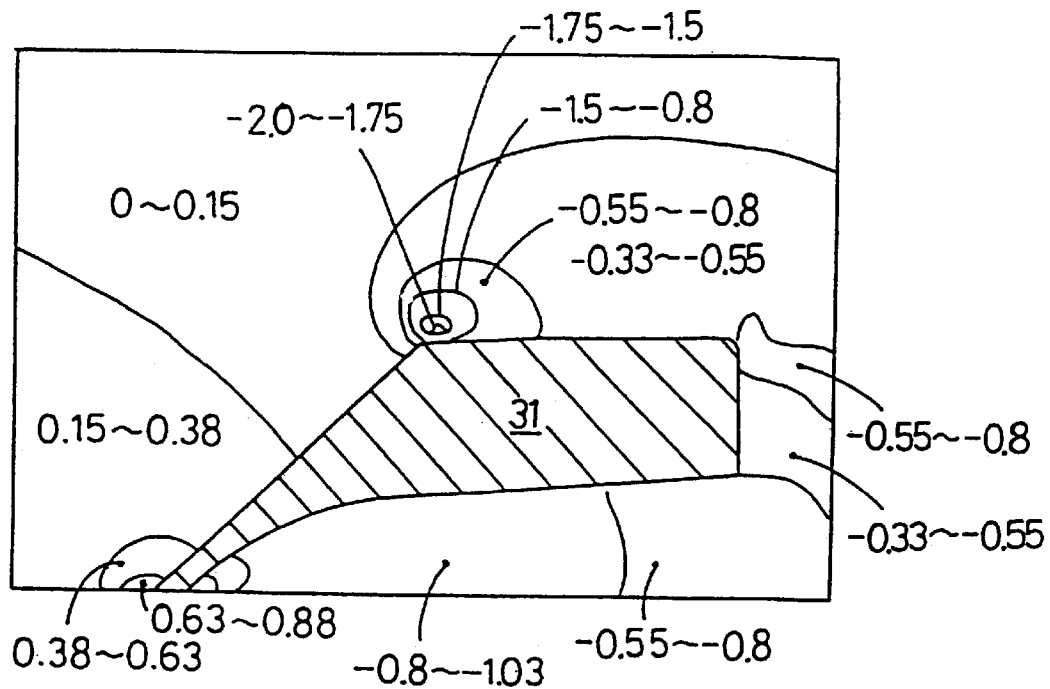
FIG. 10 is a pressure distribution chart of a conventional trapezoidal knife by FEM analysis.

FIG. 10 shows the pressure distribution of the trapezoidal knife 31, and FIG. 11 shows the pressure distribution of the knife 7 of the present invention. In these figures, the unit of pressure numerical values shown in the respective areas is $kg/cm^2$.

As is apparent from FIG. 10, a large pressure drop occurs in the ridge line part between the front surface 35 and the back surface 36 in the conventional trapezoidal knife 31, and the water flow is peeled in this part. The effect of this peeling is extended to the rear, producing a large low pressure area in the rear of the knife 31.

In contrast to this, since the front surface 35 is continued to the back surface 36 so that no ridge line appear in the knife 31 of the invention as is apparent from FIG. 11, no peeling is caused. Therefore, the low pressure area is semi circularly settled above the knife 7, not extending to the rear of the rear surface 37.

Figure 12:
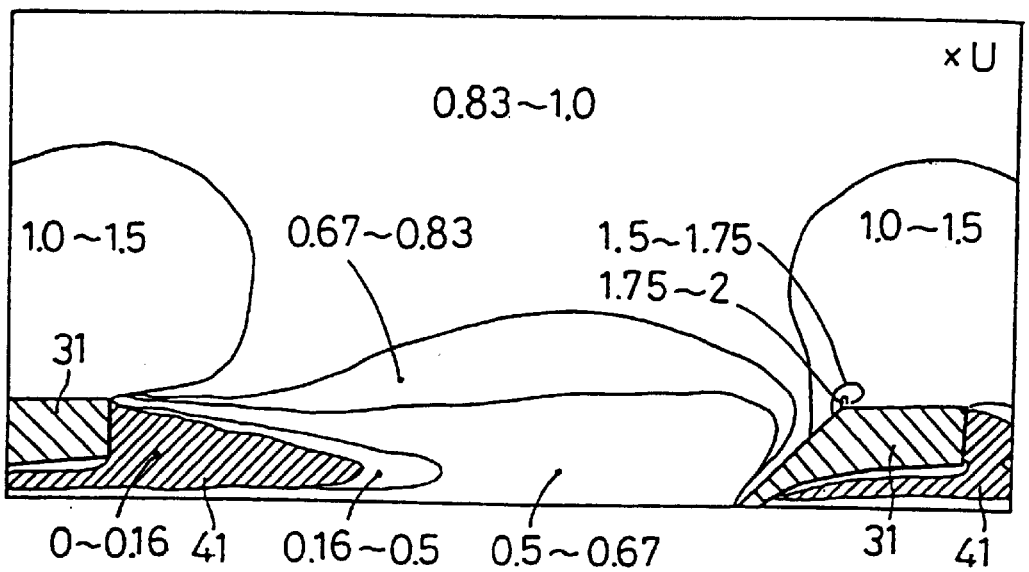
FIG. 12 is a velocity distribution chart of the conventional trapezoidal knife by FEM analysis.
Figure 13:
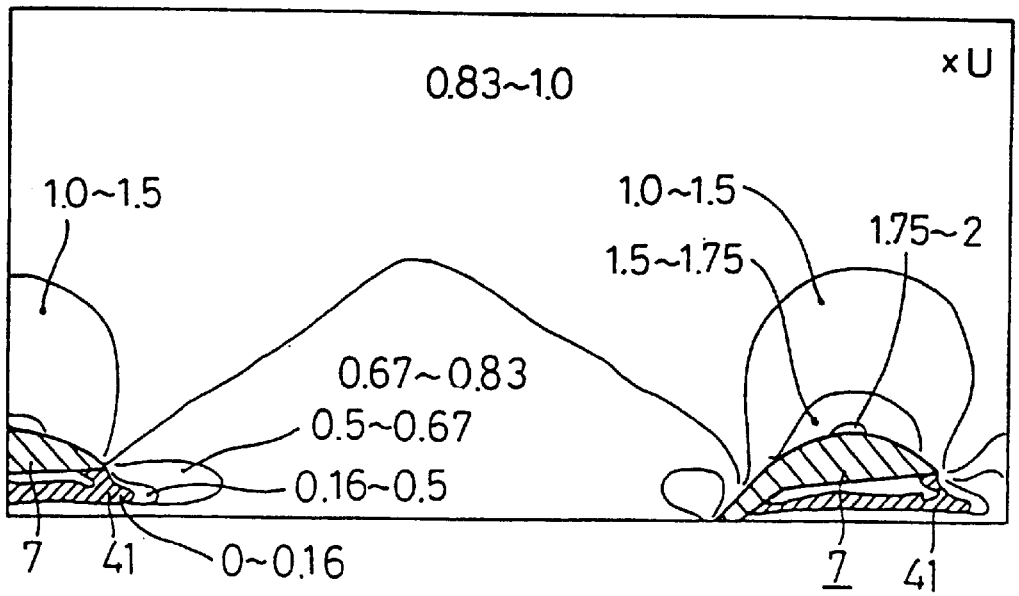
FIG. 13 is a velocity distribution chart of the knife according to the present invention by FEM analysis.

FIG. 12 shows the velocity distribution of the trapezoidal knife 31, and FIG. 13 shows the velocity distribution of the knife 7 of the present invention. In these figures U shows the average flow velocity of water flow. Thus, the velocities in the respective areas are shown by how many times the average flow velocity U they correspond to.

As is apparent from FIG. 12, in the conventional trapezoidal knife 31, a part 41 having substantially the same velocity as the knife 31 (the area having a velocity of 0–0.16U: hereinafter referred to as the same velocity water flow part) which is generated in the rotating directional rear of the knife 31 is rather extended by the effect of the turbulence accompanying the peeling. Thus, it is considered that the opportunity of mowing down the regularly extruded fused resin 4 by this long same velocity water flow part 41 is increased in the conventional knife 31, whereby the probability of occurrence of the shape failure in the pellets 5 is increased.

In contrast to this, since no peeling is caused in the knife 7 of the present invention, and the turbulence is thus hardly caused in the rear of the knife 7 as shown in FIG. 13, the same velocity water flow part 41 running near the die plate together with the knife 4 is extremely shortened. Thus, it is considered that the opportunity of mowing down the regularly extruded fused resin 4 by the same velocity water flow part 41 is almost eliminated to reduce the probability of occurrence of the shape failure in the pellets.

Determination of Allowable Length of the Same Velocity Water Flow Part

It is necessary to clarify to which degree of length the part 41 is allowable, although it is found that the shape failure of pellets can be solved by minimizing the same velocity water flow part 41. In order to determine the allowable length of the same velocity water flow part 41 capable of solving or reducing the shape failure of the pellets 5 as desired, the experiment was further continued.

As the reference of the length to be relatively compared with the length of the same velocity water flow part 41, the extrusion length H of the fused resin 4 defined as follows was adapted. Because it is considered that the larger the extruding length H is, the more the fused resin 4 is deformed to easily cause the shape failure in the pellets 5, while the smaller the extrusion length H is, conversely, the less the fused resin 4 is deformed to hardly cause the shape failure.

H: The extrusion length of the fused resin extruded form the die plate during the period from the cutting by the knife to the cutting by the following knife.

This extrusion length H can be calculated according to the following expression (3).

$$H=(Q\times 1000/3600)/\rho\times(60/nN)/(\pi d^2/4)\times 10 \qquad (3)$$

Q: Flow rate of resin per die hole (kg/hr)
ρ: Density of resin material (g/cm$^3$)
n: Number (pieces) of knives
N: Rotating speed of knife (rpm)
d: Diameter of die hole (cm)

The granulation test was actually repeated with the sectional form of the knife 7 of the present invention being variously changed to examine the relation between the length L of the same velocity water flow part 41 and the H described above. The result is shown in Table 2. In this granulation test, the MFR of the fused resin 4 was set to 80.

TABLE 2

| MFR = 80 | | L/H = 2 | L/H = 4 | L/H = 6 | L/H = 8 | L/H = 10 | L/H = 12 |
|---|---|---|---|---|---|---|---|
| Velocity of Knife | 10 (m/s) | ⊚ | ○ | Δ | × | × | × |
| | 20 (m/s) | ○ | Δ | × | × | × | × |

Pellet shape:
⊚ Extremely excellent
○ Excellent
Δ Tolerable
× Improper

However, it is the judgment criteria of shape failure in the pellets 5 that is necessary first.

Thus, an ideal state where a fused resin 5 extruded without being entirely disturbed by the water flow is cut by the knife 7 is supposed as shown in FIG. 14, and the maximum typical length of an ideal pellet in this case is assumed as X In FIG. 14, the width X is taken as the maximum typical length since the extrusion length Y is smaller than the width X.

A defective state where the fused resin 5 mowed down by the water flow is cut by the knife 7 is also supposed, and the maximum typical length of an abnormal pellet in this case is assumed as X'. In FIG. 15, the length in the elongating direction X' is taken as the maximum typical length since it is the largest.

One hundred pieces of the pellets 5 obtained by actual granulation were extracted, the maximum typical length X' thereof was measured to calculate the average value of X'/X, and the evaluation was performed as follows on the basis of the fluctuation of the average value.

Extremely excellent (⊚): X'/X=1.00~1.15
Excellent (○): X'/X=1.15~1.30
Tolerable (Δ): X'/X=1.30~1.45
Improper (X): X'/X=1.45~

As is apparent from Table 2, it was found that the length L of the same velocity water flow part 41 within 4 times the above H hardly had an influence on the shape failure of the pellets 5 without improper (X). When the length L of the same velocity water flow part 41 is preferably within 2 times the above H, a satisfactory result can be provided even at a knife speed of 20 m/s, and the shape failure of the pellets 5 is hardly caused.

Accordingly, by setting the rotating speed of the driving means 21 of the cutter 3 so that the relation of L≦4H is regularly established, the shape failure of the pellets 5 can be solved as a first step. When the rotating speed of the driving means 21 of the cutter 3 is set so that the relation of L≦2H is regularly established, the shape of the pellets 5 can be extremely satisfactorily kept.

EXAMPLE 3

In order to examine the effect of the sectional form of the knife on the length L of the same velocity water flow part 41 in more detail, the numerical experiment by FEM analysis described above was performed with the sectional form of the knife being variously changed.

Figure 16:
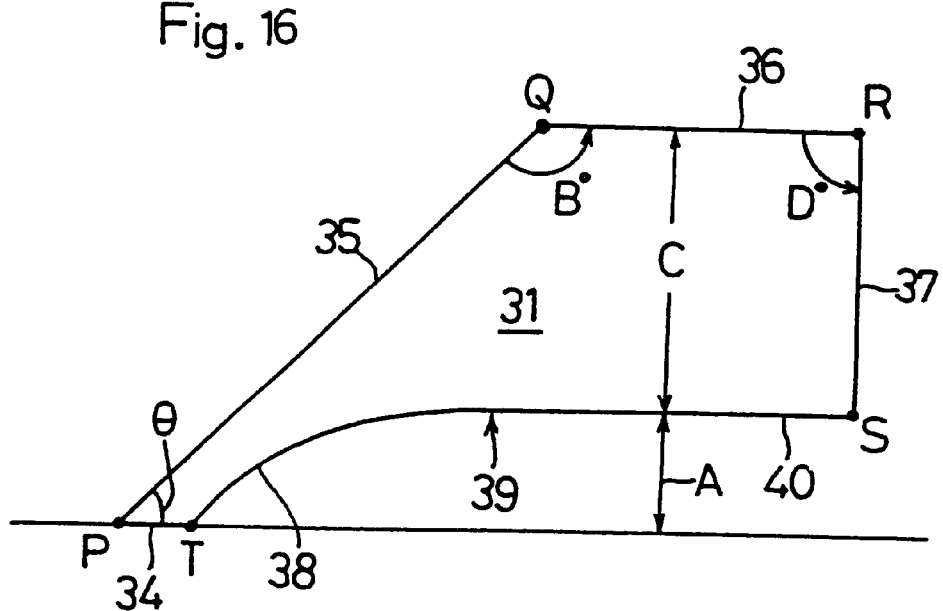
FIG. 16 is a sectional view of the conventional trapezoidal knife for illustrating the definitions of transition angles B and D, maximum thickness C, and maximum distance A.
Figure 17:
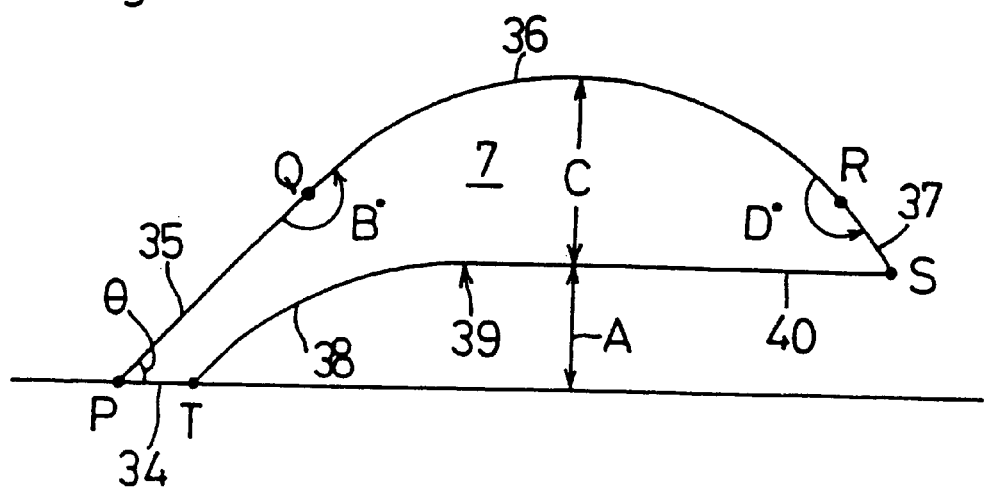
FIG. 17 is a sectional view of the knife according to the present invention for illustrating the definitions of transition angles B and D, maximum thickness C, and maximum distance A

FIG. 16 and FIG. 17 show the manner of measuring the sectional dimension of the knife adapted by this numerical experiment. FIG. 16 shows the conventional trapezoidal knife 31 in which the back surface 36 crosses both the front surface 35 and the fear surface 37, and the rear surface 37 is vertical to the die 2.

The points on the outer surface of the knife 31 where peeling might occur are the intersection Q between the back surface 36 and the front surface 35 and the intersection R between the back surface 36 and the rear surface 37. Therefore, the influence of the average value of the crossed axes angles B and D in these points on the length L of the same velocity water flow part 41 was examined.

Further, since the turbulence can occur in the rear of the knife 31 as described above when the maximum thickness C of the knife 7 is large, the influence of the ratio of the maximum thickness C to the maximum distance A of the inner surface 39 on the length L of the same velocity water flow part 41 was also examined.

On the other hand, FIG. 17 shows the knife 7 of the present invention in which the rear surface 37 is inclined, and the back surface 36 is curved so as to be smoothly continued to both of the front surface 35 and the rear surface 37. Since the back surface 36 is smoothly continued to both of the front surface 35 and the rear surface 37, the transition angles B and D were evaluated as 180°, respectively.

In this numerical experiment, the inclination θ of the front surface 35 is set to a fixed value of 45°. It was assumed that the MRF of the fused resin 4 was 80, and the extrusion length H per unit time thereof was 2.5 mm. In this experiment, L≦4×2.5 mm=100 mm, and the case where the length L of the same velocity water flow part 41 is 10 mm or less is passable.

FIG. 18 shows the sectional form of each of knives Nos. 1~8 adapted in this FEN analysis. FIGS. 19~22 show the distribution state of the same velocity water flow part 41 in each of the knives No. 1~8, and Table 3 shows the length of the same velocity water flow part 41 in each of the knives Nos. 1~8.

TABLE 3

| | Thickness of Cutting Edge (mm) | (B + D)/2 (°) | C/A | Length of same velocity area in V = 10 (m/s) (mm) | Length of same velocity area in V = 20 (m/s) (mm) |
|---|---|---|---|---|---|
| Knife 1 | 7.64 | 110° | 1.4 | 24.0 | 24.0 |
| Knife 2 | 5.23 | 110° | 1.0 | 14.0 | 14.0 |
| Knife 3 | 4.69 | 180° | 0.9 | 3.5 | 3.5 |
| Knife 4 | 7.36 | 180° | 1.3 | 6.0 | 6.0 |
| Knife 5 | 4.69 | 150° | 0.9 | 3.7 | 3.7 |
| Knife 6 | 7.55 | 150° | 1.4 | 7.0 | 24.0 |
| Knife 7 | 7.63 | 120° | 1.4 | 32.0 | 32.0 |
| Knife 8 | 6.25 | 130° | 1.1 | 15.0 | 15.0 |

As is apparent from Table 3, it was in only the knives Nos. 3~4 that the length L of the same velocity water flow part could be made to 10 mm or less even in V=20 m/s. It is apparent from the satisfactory result of the knife No. 5 that the length L of the same velocity water flow part 41 can be shortened by setting (B+C)/2 and C/A to proper values, even if the back surface of the knife is flat.

Each of the knives Nos. 1~8 was installed to a testing underwater cutting granulating device to actually manufacture the pellets 5, which were then evaluated for shape on the basis of the evaluation criteria described above. The result is shown in Table 4.

In the test kneading, the fused resin 4 with MFR of 80 was used similarly to the assumption in the above numerical analysis, and the extrusion length H per unit time was set to 2.5 mm.

TABLE 4

| MFR = 80 | | (B + D)/2 | | | | |
|---|---|---|---|---|---|---|
| | | 100° | 120° | 140° | 160° | 180° |
| C/A | 1.4 | × K1 | × K7 | × K6 | △ | △ K4 |
| | 1.2 | × | × | × K8 | ○ | ○ |
| | 1.0 | × | × K2 | × △ | ◎ K5 | ◎ K3 |
| | 0.8 | × | × | ○ | ◎ | ◎ |

Pellet shape:  ◎ Extremely excellent
 ○ Excellent
 △ Tolerable
 × Improper

As is apparent from Tables 3 and 4, in order to obtain an evaluation of excellent (○) or more with respect to tile shape of the pellets 5, it is sufficient to rotate the knife so that the length L of the same velocity water flow part 41 is 4H or less.

The length L of the same velocity water flow part 41 can be made to 4H or less at a high rotating speed of knife of 10~20 m/s only by setting the form of the knife to 150°≦ (B+D)/2≦180° and C/A 1.2.

EXAMPLE 4

Figure 23:
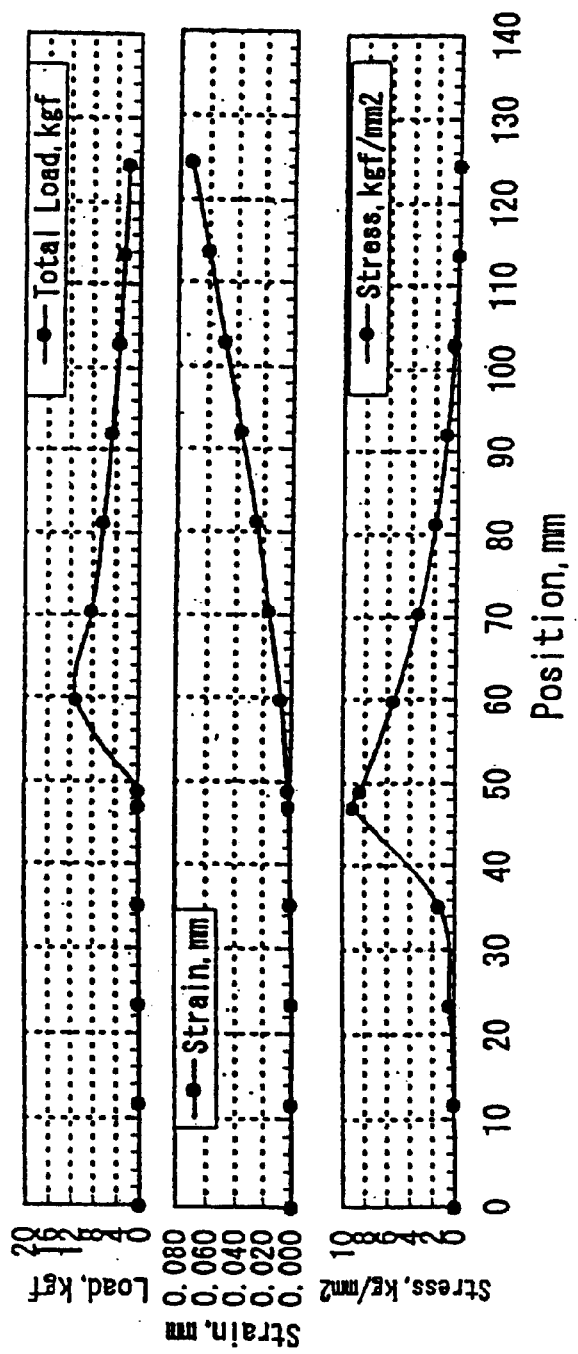
FIG. 23 is a view showing the form and dynamic characteristics of the most standard trapezoidal knife.
Figure 29:
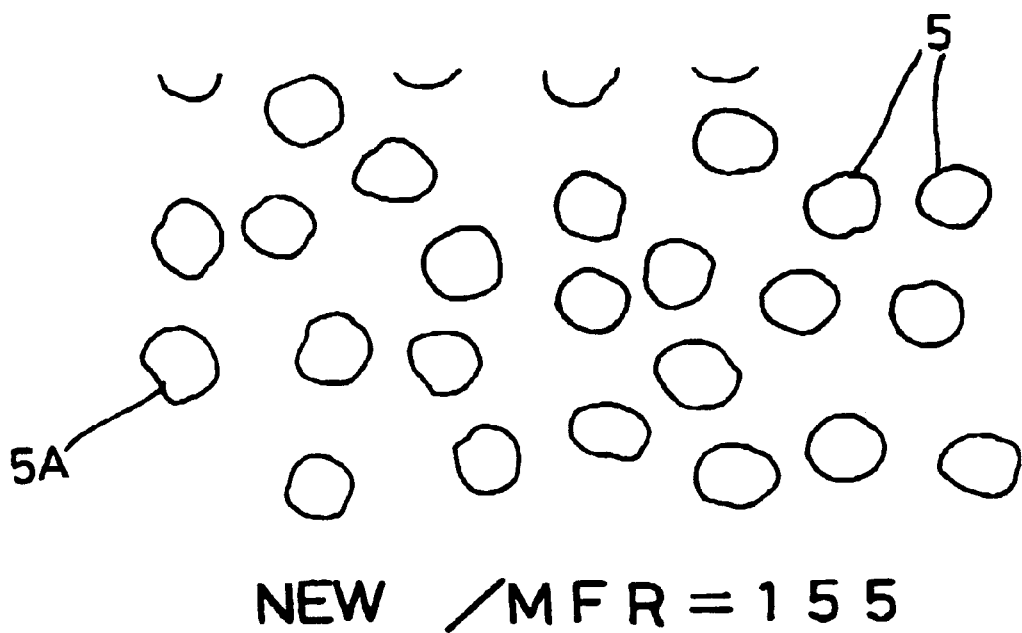
FIG. 29 is an enlarged view of pellets with MRF=155.

FIG. 23 and FIG. 24 comparatively show the forms and dynamic characteristics of the conventional trapezoidal knife 31 most generally used and the knife 7 of the present invention.

The trapezoidal knife 31 of FIG. 23 is set to (B+D)/2= 110° and C/A=1.4.

On the other hand, the knife 7 of the present invention of FIG. 24 is set to (B+D)/2=180° and C/A=0.9.

The knife 7 of FIG. 24 has a part 44 wider than the other part 43 having cutting function in the position corresponding to the rotating directional central side part of the die plate 2 to which the fused resin 4 is not extruded.

Therefore, as is apparent from the load curve of FIG. 24, the load is effectively received by the root side of the knife 7. The stress acting on the cutter surface 34 of the knife 7 can be entirely reduced as shown by the stress curve of FIG. 24, and the maximum distortion on the tip side of the knife 7 can be also minimized as shown by the distortion curve of FIG. 24.

FIGS. 25~29 are enlarged views of the pellets 5 obtained by granulation with various MFR values by use of the trapezoidal knife 31 (STAND) of FIG. 23 and the knife 7 (NEW) of the present invention of FIG. 24 under the same condition, respectively.

As shown in FIG. 25, the shape failure of the pellets 5 is hardly observed in both the knives with MFR=30. However, many distorted pellets 5A start to be included in the trapezoidal knife 31 of FIG. 23 even with MFR=60~85, which shows that a considerable number of pellets 5A are involved in shape defect as for MFR=15 (FIG. 28).

In contrast to this, the shape failure of the pellets 5 is suppressed to a minimum with both MFR=115 (FIG. 28) and Mi=155 in the knife 7 of the present invention of FIG. 24.

The trapezoidal knife 31 of FIG. 23 and the knife 7 of the present invention of FIG. 24 were rotated under various rotating speeds within the water chamber 1 to inspect the state of occurrence of cavitation. In the trapezoidal knife 31 of FIG. 23, generation of bubbles by cavitation was observed at a knife speed of 13.3 m/s, and the water chamber 1 was filled with bubbles so that it became snow-white as for 19.0 m/s.

In contrast to this, no bubble was generated within the knife speed range of 13.3~19.0 m/s in the knife 7 of the present invention of FIG. 24, and it was confirmed that the transparency of the same degree as still water could be attained even at a speed lower than 19.0 m/s.

The present invention is never limited by each of the embodiments described above, and the details of the knife form, the number of knives 7 to be mounted on the cutter 3, and the detail structure as underwater cutting granulating device can be properly changed.

Further, the fused resin 4 to be used is not limited to high MFR materials, and the material thereof is nor particularly limited.

What is claimed is:

1. An underwater cutting granulating device for cutting and granulating a fused resin extruded from a die into a water chamber by a cutter rotated in the state where a knife is opposed to the die, the knife of the cutter having a convex guide surface for guiding a water flow in the direction of drawing it toward the die, which is formed on a surface opposite to a surface facing the die, wherein a guide surface of the knife facing the die has a front part inclined away from the die and a rear part inclined toward the die, as viewed in a direction from the front part toward the rear part.

2. An underwater cutting granulating device according to claim 1 wherein the knife is formed so that a height dimension (h) thereof becomes thinner along the rotating direction in order to reduce the velocity of the circling directional water flow generated along a front surface of the die.

3. An underwater cutting granulating device according to claim 1 whereby a sectional form of the knife has a streamline shape in a rotating direction.

4. An underwater cutting granulating device for cutting and granulating a fused resin extruded from a die into a water chamber by a cutter rotated in the state where a knife is opposed to the die, the knife of the cutter having a convex guide surface for guiding a water flow in the direction of drawing it toward the die, which is formed on a surface opposite to a surface facing the die and has a front part inclined away from the die, a middle part merging with the front part and a rear part inclined toward the die and merging with the middle part, wherein the middle part is formed into a curved surface so that no ridge line appears on the convex guide surface, and the knife of the cutter having a surface of the knife facing the die, which has a front part inclined away from the die, and a rear part substantially parallel to the surface of the die, wherein the rear part of the convex guide surface meets the rear part of the surface of the knife facing the die.

* * * * *